(12) United States Patent
Li et al.

(10) Patent No.: US 10,277,509 B2
(45) Date of Patent: Apr. 30, 2019

(54) DATA PROCESSING METHOD EXECUTED BY NETWORK APPARATUS, AND RELATED DEVICE

(71) Applicant: Huawei Technologies Co., Ltd., Shenzhen (CN)

(72) Inventors: Nan Li, Beijing (CN); Linchun Wang, Beijing (CN); Hongfei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 15/392,144

(22) Filed: Dec. 28, 2016

(65) Prior Publication Data

US 2017/0111275 A1 Apr. 20, 2017

Related U.S. Application Data

(63) Continuation of application No. PCT/CN2014/081267, filed on Jun. 30, 2014.

(51) Int. Cl.
*H04L 12/741* (2013.01)
*G06F 9/38* (2018.01)
(Continued)

(52) U.S. Cl.
CPC .......... *H04L 45/74* (2013.01); *G06F 9/38* (2013.01); *H04L 69/22* (2013.01); *H04L 49/15* (2013.01); *H04L 49/25* (2013.01)

(58) Field of Classification Search
None
See application file for complete search history.

(56) References Cited

U.S. PATENT DOCUMENTS 6,073,159 A 6/2000 Emer et al.
6,965,615 B1 11/2005 Kerr et al.
(Continued)

FOREIGN PATENT DOCUMENTS

CN 1618061 A 5/2005
CN 101088065 A 12/2007
(Continued)

OTHER PUBLICATIONS

Maysam Lavasani et al., "Compiling High Throughput Network Processors" Proceedings of the ACM/Sigda International Symposium on Field Programmable Gate Arrays, FPGA '12, Feb. 22-24, 2012, Monterey, CA, XP055304005, pp. 87-96.

(Continued)

*Primary Examiner* — Kouroush Mohebbi
(74) *Attorney, Agent, or Firm* — Slater Matsil, LLP

(57) ABSTRACT

A data processing method and a related device are provided. The method includes receiving, by the $i^{th}$ processing circuit in a first circuit set, a first packet header and data $D_{(1, i-1)}$, obtaining data $D'_{(1, i)}$ based on a first field in the first packet header, and sending the first packet header and data $D_{(1, i)}$ to the $(i+1)^{th}$ processing circuit in the first circuit set, where the data $D_{(1, i)}$ is obtained based on the data $D_{(1, i-1)}$ and the data $D'_{(1, i)}$. The method also includes sending, by the $i^{th}$ processing circuit in the first circuit set, the data $D_{(1, i)}$ to the $(i+1)^{th}$ processing circuit in a second circuit set and sending, by the $i^{th}$ processing circuit in the second circuit set, a second packet header to the $(i+1)^{th}$ processing circuit in the second circuit set.

24 Claims, 15 Drawing Sheets

(51) Int. Cl.
*H04L 29/06* (2006.01)
*H04L 12/933* (2013.01)
*H04L 12/947* (2013.01)

(56) References Cited

U.S. PATENT DOCUMENTS

| | | | |
|---|---|---|---|
| 2006/0262783 | A1 | 11/2006 | Nedeltchev |
| 2007/0195761 | A1 | 8/2007 | Tatar et al. |
| 2011/0096781 | A1* | 4/2011 | Aybay ................ H04L 12/5601 370/392 |

FOREIGN PATENT DOCUMENTS

| | | |
|---|---|---|
| CN | 101217498 A | 7/2008 |
| CN | 201667661 U | 12/2010 |
| CN | 102684827 A | 9/2012 |
| EP | 0405990 A2 | 1/1991 |

OTHER PUBLICATIONS

Sarit Mukherjee et al., "The Wireless Edge Router: A Network Processor-Based Packet Data Serving Node for a CDMA2000* Network" Bell Labs Technical Journal, vol. 10, No. 1, Apr. 1, 2005, Wiley, CA, XP011627537, pp. 83-104.

* cited by examiner

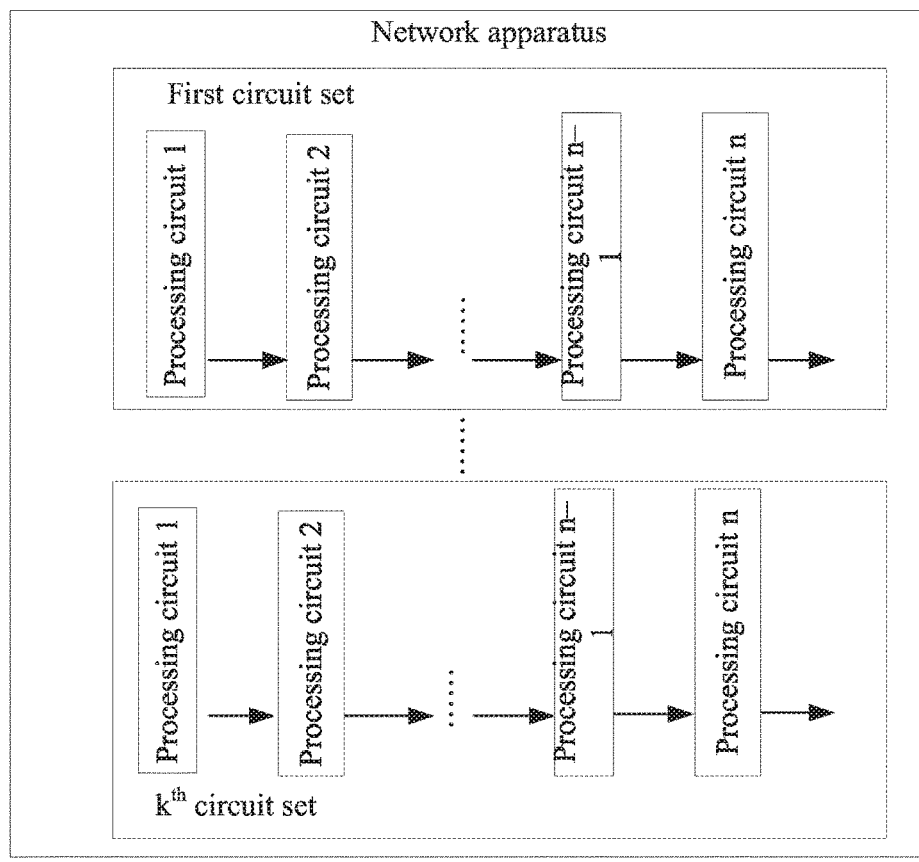
FIG. 1-a

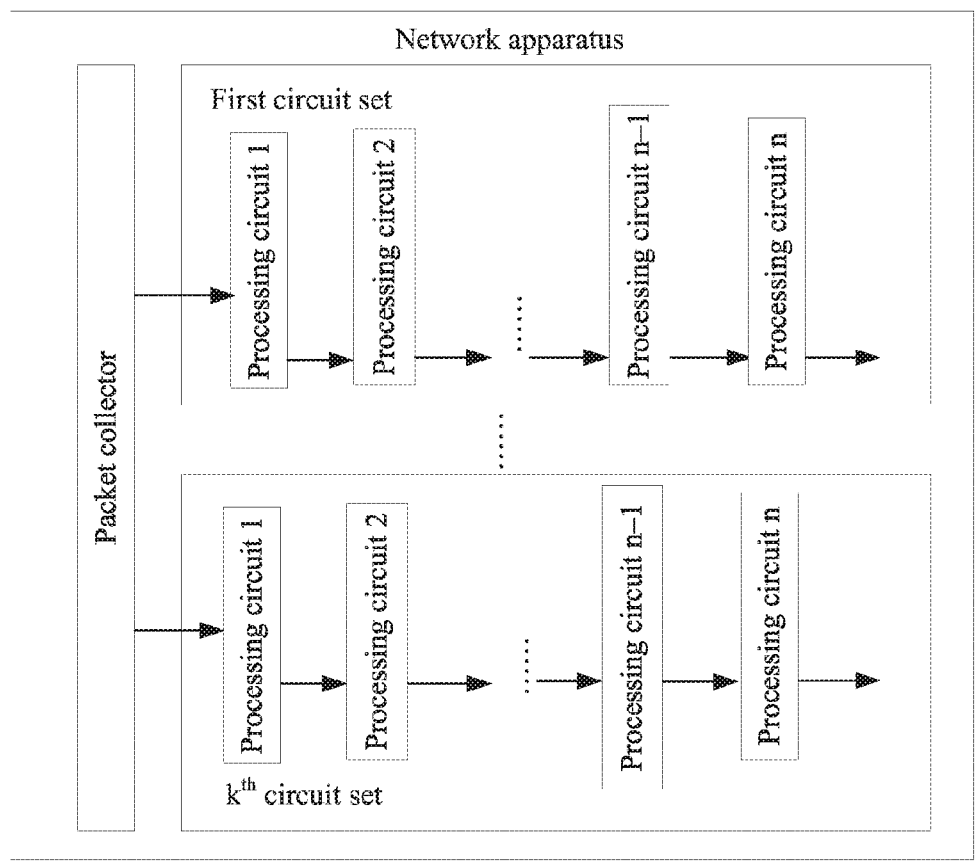
FIG. 1-b

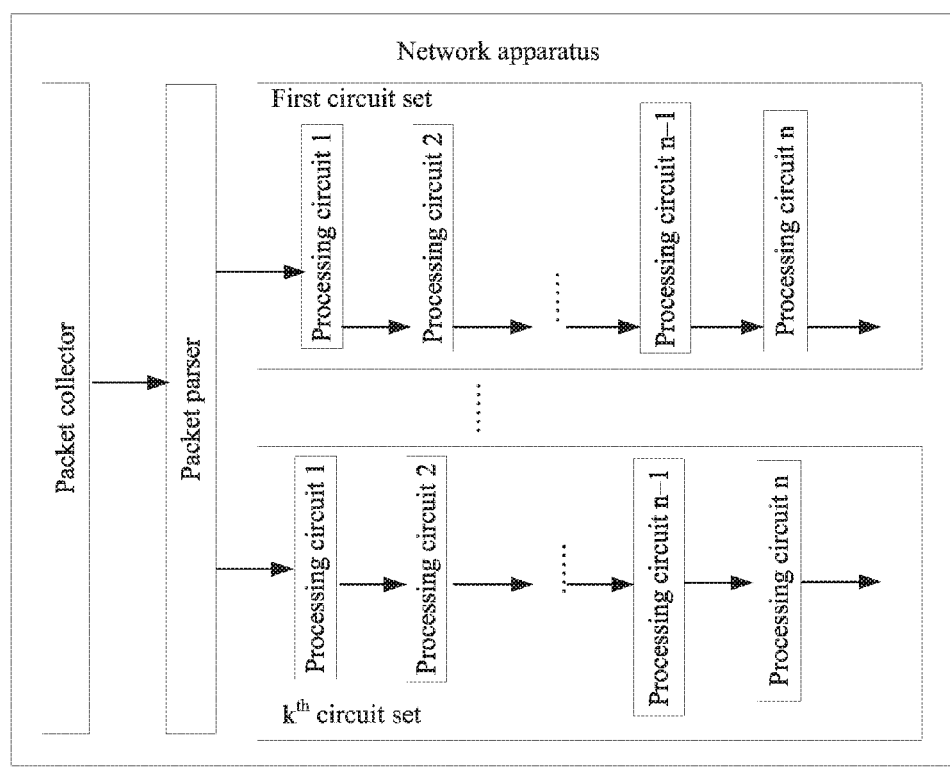
FIG. 1-c

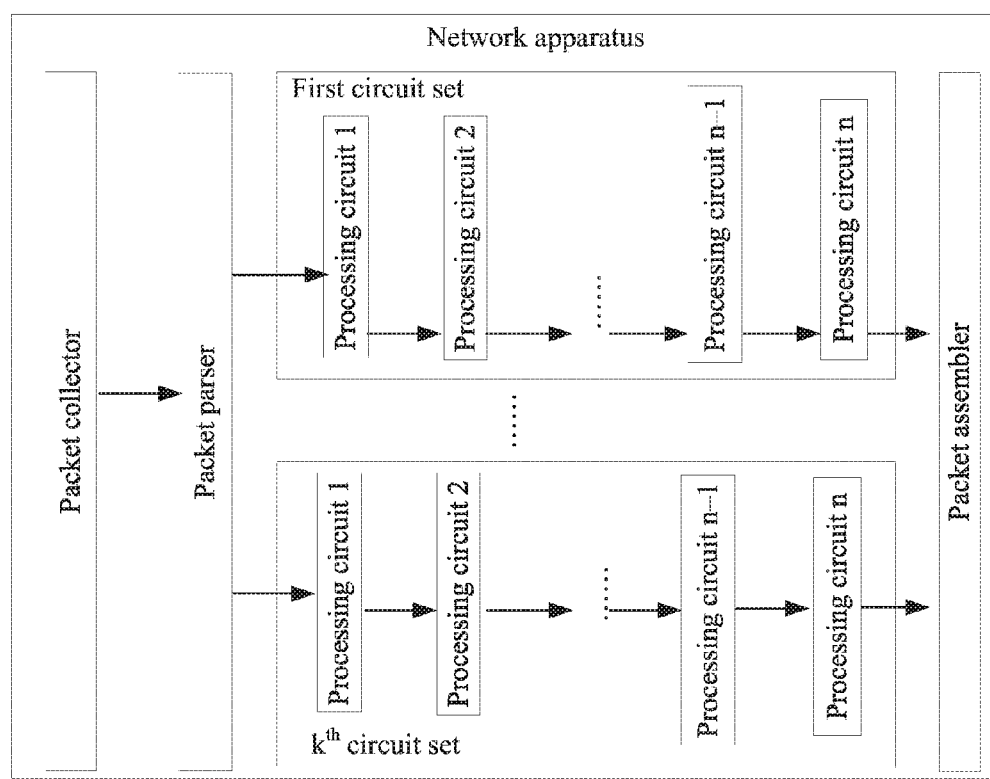
FIG. 1-d

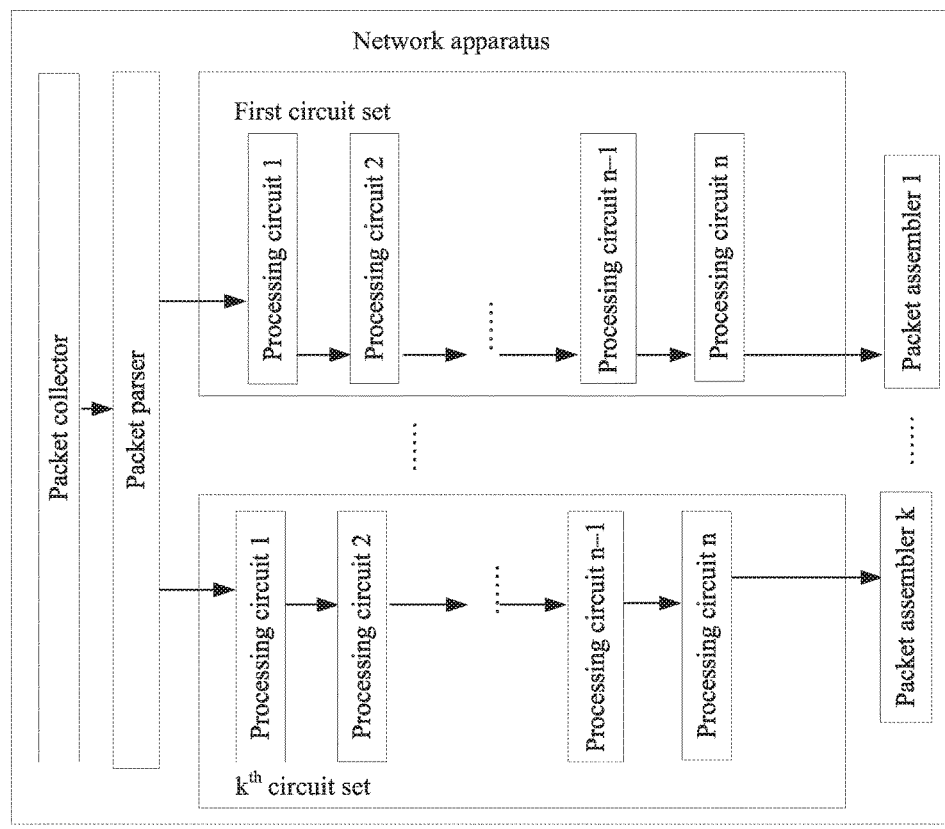
FIG. 1-e

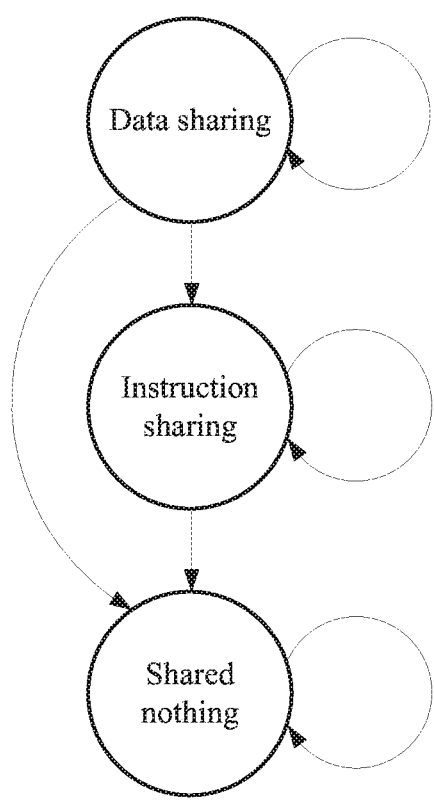
FIG. 3-a

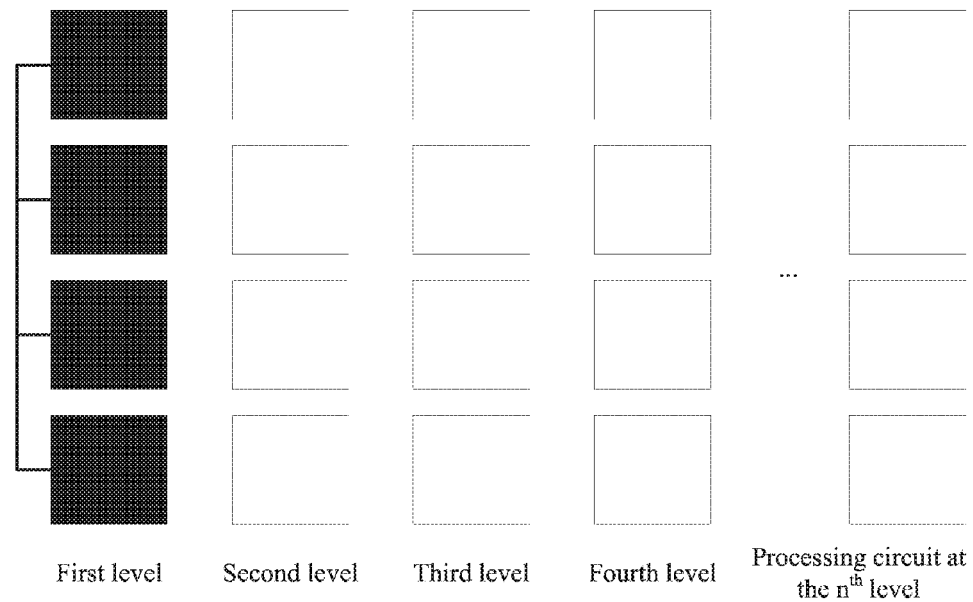
First level　Second level　Third level　Fourth level　Processing circuit at the $n^{th}$ level
FIG. 3-b
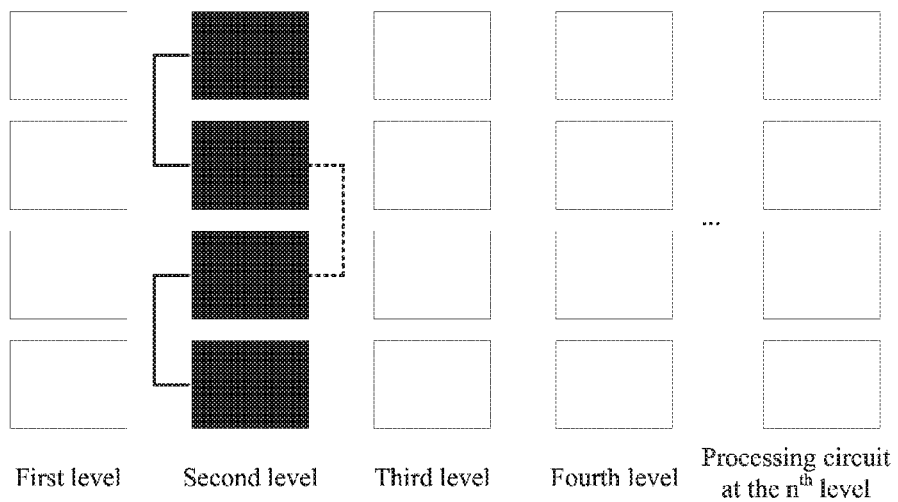
First level　Second level　Third level　Fourth level　Processing circuit at the $n^{th}$ level
FIG. 3-c

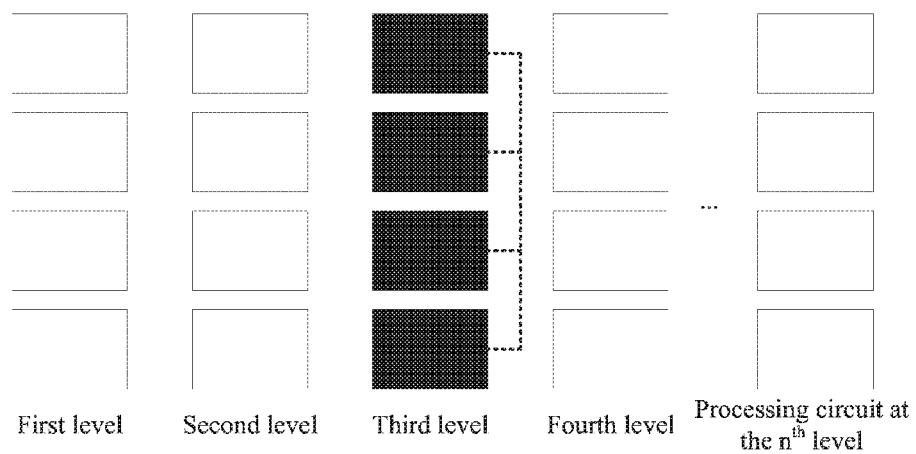
FIG. 3-d
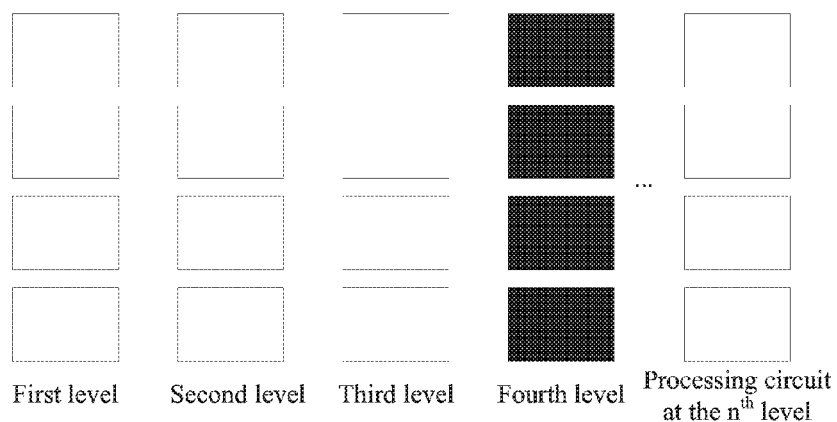
FIG. 3-e

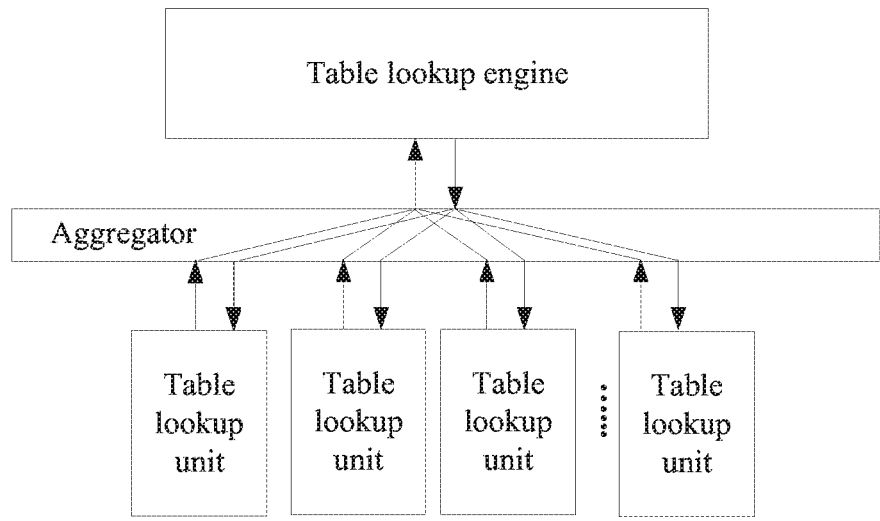
FIG. 3-f
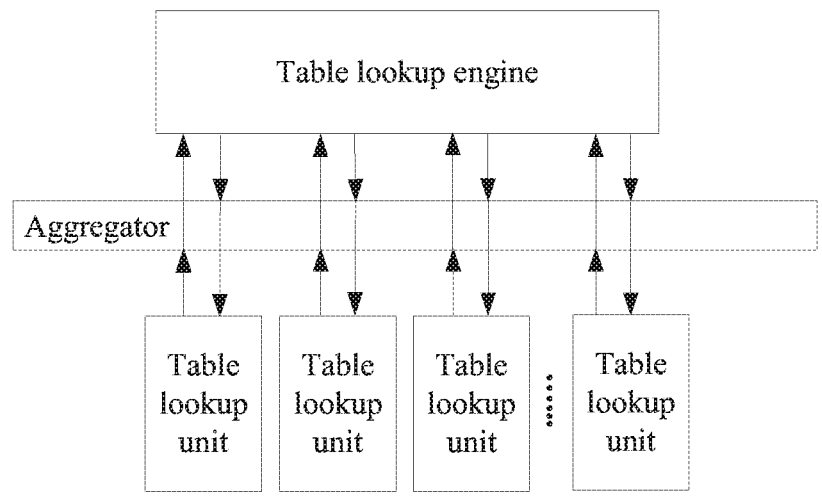
FIG. 3-g

DATA PROCESSING METHOD EXECUTED BY NETWORK APPARATUS, AND RELATED DEVICE

CROSS-REFERENCE TO RELATED APPLICATIONS

This application is a continuation of International Application No. PCT/CN2014/081267, filed on Jun. 30, 2014, the disclosure of which is hereby incorporated by reference in its entirety.

TECHNICAL FIELD

The present embodiments relate to the field of computer technologies, and in particular, to a data processing method executed by a network apparatus, and a related device.

BACKGROUND

Currently, a network processor is generally used to forward a network packet in a packet forwarding processing device such as a router or a switch. The network processor refers to a programmable processor dedicated to processing a network packet, and many private circuits are integrated inside the network processor to increase a speed at which a network packet is processed.

According to differences between implementation manners in which the network processor processes a packet, the network processor may be roughly classified into two types. A first type of network processor is generally referred to as a run-to-complete architecture. The first type of network processor is characterized in that after receiving a network packet, the network processor allocates the network packet to an idle processor core for forwarding processing, and sends a processed network packet. In other words, processing of an entire network packet is completed on one processor core, and packet data does not move during the processing process. A second type of network processor is generally referred to as a pipelining architecture. This type of network processor is characterized in that after a network packet is received, the network packet is sent to a packet processing pipeline for forwarding processing, where the entire packet processing pipeline generally includes processing circuits at multiple levels, and a processing circuit at each level may complete one or more basic processing actions by programming. During the processing process, intermediate data is passed forward along the pipeline stage by stage. A Protocol Oblivious Forwarding mechanism may be considered as a series of match-action combinations, and may be easily implemented on a network processor of the pipelining architecture.

As a requirement on processing capabilities of a packet forwarding processing device continuously increase, a network packet processing rate provided by one packet processing pipeline has been gradually incapable of meeting the requirement. In this case, multiple pipelines are simply used in the prior art to process a network packet in parallel, which forms a parallel pipelining architecture, to provide a higher packet processing rate.

During a process of studying and practicing the prior art, the inventor finds that: a major problem of a parallel pipelining architecture used in the prior art is that a quantity of resources (for example, table lookup bandwidth, instruction bandwidth, power consumption) consumed by the parallel pipelining architecture increases proportionally to a quantity of parallel pipelines. However, a semiconductor technique develops far more slowly than a bandwidth requirement of a network device; therefore, it is a great challenge to implement a chip that provides these resources.

SUMMARY

Embodiments provide a data processing method executed by a network apparatus, and a related device, to increase a utilization rate of a processing resource and reduce packet processing complexity.

According to a first aspect, a data processing method executed by a network apparatus is provided, where the network apparatus includes a first circuit set and a second circuit set, and the method includes receiving, by an $i^{th}$ processing circuit in the first circuit set, a first packet header and data $D_{(1,\ i-1)}$, obtaining data $D'_{(1,\ i)}$ based on a first field in the first packet header, and sending the first packet header and data $D_{(1,\ i)}$ to an $(i+1)^{th}$ processing circuit in the first circuit set, where the data $D_{(1,\ i)}$ is obtained based on the data $D_{(1,\ i-1)}$ and the data $D'_{(1,\ i)}$. The method also includes sending, by the $i^{th}$ processing circuit in the first circuit set, the data $D_{(1,\ i)}$ to the $(i+1)^{th}$ processing circuit in the second circuit set. Additionally, the method includes sending, by the $i^{th}$ processing circuit in the second circuit set, a second packet header to the $(i+1)^{th}$ processing circuit in the second circuit set, where a type and a value of a second field in the second packet header are the same as a type and a value of the first field in the first packet header, and a location of the second field in the second packet header is the same as a location of the first field in the first packet header.

With reference to the first aspect, in a first possible implementation manner of the first aspect, the method further includes: obtaining, by the $(i+1)^{th}$ processing circuit in the first circuit set, an instruction $I_{(1,\ i+1)}$ based on an identifier that is of the instruction $I_{(1,\ i+1)}$ and included in the data $D_{(1,\ i)}$; sending, by the $(i+1)^{th}$ processing circuit in the first circuit set, the instruction $I_{(1,\ i+1)}$ to the $(i+1)^{th}$ processing circuit in the second circuit set; obtaining, by the $(i+1)^{th}$ processing circuit in the first circuit set, data $D'_{(1,\ i+1)}$ according to the instruction $I_{(1,\ i+1)}$ and the first packet header, and sending data $D_{(1,\ i+1)}$ and the first packet header to the $(i+2)^{th}$ processing circuit in the first circuit set, where the data $D_{(1,\ i+1)}$ is obtained based on the data $D_{(1,\ i)}$ and the data $D'_{(1,\ i+1)}$; and obtaining, by the $(i+1)^{th}$ processing circuit in the second circuit set, data $D'_{(2,\ i+1)}$ according to the instruction $I_{(1,\ i+1)}$ and the second packet header, and sending data $D_{(2,\ i+1)}$ and the second packet header to the $(i+2)^{th}$ processing circuit in the second circuit set, where the data $D_{(2,\ i+1)}$ is obtained based on the data $D_{(1,\ i)}$ and the data $D'_{(2,\ i+1)}$.

With reference to the first possible implementation manner of the first aspect, in a second possible implementation manner of the first aspect, the method further includes: obtaining, by the $(i+2)^{th}$ processing circuit in the first circuit set, an instruction $I_{(1,\ i+2)}$ based on an identifier that is of the instruction $I_{(1,\ i+2)}$ and included in the data $D_{(1,\ i+1)}$, obtaining data $D'_{(1,\ i+2)}$ according to the processing instruction $I_{(1,\ i+2)}$ and the first packet header, and sending the first packet header and data $D_{(1,\ i+2)}$ to the $(i+3)^{th}$ processing circuit in the first circuit set, where the data $D_{(1,\ i+2)}$ is obtained based on the data $D_{(1,\ i+1)}$ and the data $D'_{(1,\ i+2)}$; and obtaining, by the $(i+2)^{th}$ processing circuit in the second circuit set, an instruction $I_{(2,\ i+2)}$ based on an identifier that is of the instruction $I_{(2,\ i+2)}$ and included in the data $D_{(2,\ i+1)}$, obtaining data $D'_{(2,\ i+2)}$ according to the instruction $I_{(2,\ i+2)}$ and the second packet header, and sending data $D_{(2,\ i+2)}$ and the second packet header to the $(i+3)^{th}$ processing circuit in the second circuit set, where the data $D_{(2, i+2)}$ is obtained based on the data $D_{(2, i+1)}$ and the data $D'_{(2, i+2)}$.

With reference to the first aspect, in a third possible implementation manner of the first aspect, the method further includes: obtaining, by the $(i+1)^{th}$ processing circuit in the first circuit set, an instruction $I_{(1, i+1)}$ based on an identifier that is of the instruction $I_{(1, i+1)}$ and included in the data $D_{(1, i)}$, obtaining data $D'_{(1, i+1)}$ according to the processing instruction $I_{(1, i+1)}$ and the first packet header, and sending data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, i+1)}$; and obtaining, by the $(i+1)^{th}$ processing circuit in the second circuit set, an instruction $I_{(2, i+1)}$ based on an identifier that is of the instruction $I_{(2, i+1)}$ and included in the data $D_{(1, i)}$, obtaining data $D'_{(2, i+1)}$ according to the instruction $I_{(2, i+1)}$ and the second packet header, and sending data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$.

With reference to the third possible implementation manner of the first aspect, in a fourth possible implementation manner of the first aspect, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the obtaining, by the $(i+1)^{th}$ processing circuit in the first circuit set, data $D'_{(1, i+1)}$ according to the instruction $I_{(1, i+1)}$ and the first packet header includes: obtaining, by the $(i+1)^{th}$ table lookup unit in the $(i+1)^{th}$ processing circuit in the first circuit set, data $B_{(1, i+1)}$ by means of table lookup; and obtaining, by the $(i+1)^{th}$ instruction executing unit in the $(i+1)^{th}$ processing circuit in the first circuit set, the data $D'_{(1, i+1)}$ according to the instruction $I_{(1, i+1)}$, the data $B_{(1, i+1)}$, and the first packet header; and the obtaining, by the $(i+1)^{th}$ processing circuit in the second circuit set, data $D'_{(2, i+1)}$ according to the instruction $I_{(2, i+1)}$ and the second packet header includes: obtaining, by the $(i+1)^{th}$ table lookup unit in the $(i+1)^{th}$ processing circuit in the second circuit set, data $B_{(2, i+1)}$ by means of table lookup; and obtaining, by the $(i+1)^{th}$ instruction executing unit in the $(i+1)^{th}$ processing circuit in the second circuit set, the data $D'_{(2, i+1)}$ according to the instruction $I_{(2, i+1)}$, the data $B_{(2, i+1)}$, and the second packet header.

With reference to the fourth possible implementation manner of the first aspect, in a fifth possible implementation manner of the first aspect, the network apparatus further includes an aggregator and a table lookup engine; the obtaining, by the $(i+1)^{th}$ table lookup unit in the $(i+1)^{th}$ processing circuit in the first circuit set, data $B_{(1, i+1)}$ by means of table lookup includes: sending, by the $(i+1)^{th}$ table lookup unit in the $(i+1)^{th}$ processing circuit in the first circuit set, a table lookup request $Q_{(1, i+1)}$ to the aggregator, and receiving the data $B_{(1, i+1)}$ fed back by the aggregator; the obtaining, by the $(i+1)^{th}$ table lookup unit in the $(i+1)^{th}$ processing circuit in the second circuit set, data $B_{(2, i+1)}$ by means of table lookup includes: sending, by the $(i+1)^{th}$ table lookup unit in the $(i+1)^{th}$ processing circuit in the second circuit set, a table lookup request $Q_{(2, i+1)}$ to the aggregator, and receiving, by the $(i+1)^{th}$ table lookup unit in the $(i+1)^{th}$ processing circuit in the second circuit set, the data $B_{(2, i+1)}$ fed back by the aggregator; and the method further includes: after receiving the table lookup request $Q_{(2, i+1)}$ and the table lookup request $Q_{(1, i+1)}$, sending, by the aggregator, the table lookup request $Q_{(2, i+1)}$ or the table lookup request $Q_{(1, i+1)}$ to the table lookup engine, receiving the data $B_{(2, i+1)}$ sent by the table lookup engine in response to the table lookup request $Q_{(2, i+1)}$ or the table lookup request $Q_{(1, i+1)}$, feeding back the data $B_{(1, i+1)}$ to the $(i+1)^{th}$ table lookup unit in the $(i+1)^{th}$ processing circuit in the first circuit set, and feeding back the data $B_{(2, i+1)}$ to the $(i+1)^{th}$ table lookup unit in the $(i+1)^{th}$ processing circuit in the second circuit set, where the data $B_{(2, i+1)}$ is the same as the data $B_{(1, i+1)}$, and the table lookup request $Q_{(2, i+1)}$ and the table lookup request $Q_{(1, i+1)}$ include a same table search key value.

With reference to the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, the network apparatus further includes an arbiter, and the method further includes: sending, by the arbiter, a data sharing indication to the $i^{th}$ processing circuit in the first circuit set when determining that a type and/or a value of a third field in the second packet header that needs to be processed by the $(i+1)^{th}$ processing circuit in the second circuit set is different from a type and/or a value of a fourth field in the first packet header that needs to be processed by the $(i+1)^{th}$ processing circuit in the first circuit set, where the sending, by the $i^{th}$ processing circuit in the first circuit set, the data $D_{(1, i)}$ to the $(i+1)^{th}$ processing circuit in the second circuit set includes: sending, by the $i^{th}$ processing circuit in the first circuit set, the data $D_{(1, i)}$ to the $(i+1)^{th}$ processing circuit in the second circuit set in response to the data sharing indication.

According to a second aspect, a data processing method executed by a network apparatus is provided, where the network apparatus includes a first circuit set and a second circuit set, and the method includes receiving, by an $i^{th}$ processing circuit in the first circuit set, a first packet header and data $D_{(1, i-1)}$, obtaining an instruction $I_{(1, i)}$ based on an identifier that is of the instruction $I_{(1, i)}$ and included in the data $D_{(1, i-1)}$, and sending the instruction $I_{(1, i)}$ to the $i^{th}$ processing circuit in the second circuit set. The method also includes obtaining, by the $i^{th}$ processing circuit in the first circuit set, data $D'_{(1, i)}$ according to the instruction $I_{(1, i)}$ and the first packet header and sending, by the $i^{th}$ processing circuit in the first circuit set, data $D_{(1, i)}$ and the first packet header to an $(i+1)^{th}$ processing circuit in the first circuit set, where the data $D_{(1, i)}$ is obtained based on the data $D_{(1, i-1)}$ and the data $D'_{(1, i)}$. Additionally, the method includes receiving, by the $i^{th}$ processing circuit in the second circuit set, a second packet header and data $D_{(2, i-1)}$, obtaining data $D'_{(2, i)}$ according to the instruction $I_{(1, i)}$ and the second packet header, and sending data $D_{(2, i)}$ and the second packet header to the $(i+1)^{th}$ processing circuit in the second circuit set, where the data $D_{(2, i)}$ is obtained based on the data $D'_{(2, i)}$ and the data $D_{(2, i-1)}$.

With reference to the second aspect, in a first possible implementation manner, the method further includes: obtaining, by the $(i+1)^{th}$ processing circuit in the first circuit set, an instruction $I_{(1, i+1)}$ based on an identifier that is of the instruction $I_{(1, i+1)}$ and included in the data $D_{(1, i)}$, obtaining data $D'_{(1, i+1)}$ according to the processing instruction $I_{(1, i+1)}$ and the first packet header, and sending data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, i+1)}$; and obtaining, by the $(i+1)^{th}$ processing circuit in the second circuit set, an instruction $I_{(2, i+1)}$ based on an identifier that is of the instruction $I_{(2, i+1)}$ and included in the data $D_{(2, i)}$, obtaining data $D'_{(2, i+1)}$ according to the instruction $I_{(2, i+1)}$ and the second packet header, and sending data $D_{(2, i+1)}$ and the second packet header to the $(i+2)^{th}$ processing circuit in the second circuit set, where the data $D_{(2, i+1)}$ is obtained based on the data $D_{(2, i)}$ and the data $D'_{(2, i+1)}$.

With reference to the first possible implementation manner of the second aspect, in a second possible implementation manner of the second aspect, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the obtaining, by the $(i+1)^{th}$ processing circuit in the first circuit set, data $D'_{(1, i+1)}$ according to the instruction $I_{(1, i+1)}$ and the first packet header includes: obtaining, by the $(i+1)^{th}$ table lookup unit in the $(i+1)^{th}$ processing circuit in the first circuit set, data $B_{(1, i+1)}$ by means of table lookup; and obtaining, by the $(i+1)^{th}$ instruction executing unit in the $(i+1)^{th}$ processing circuit in the first circuit set, the data $D'_{(1, i+1)}$ according to the instruction $I_{(1, i+1)}$, the data $B_{(1, i+1)}$, and the first packet header; and the obtaining, by the $(i+1)^{th}$ processing circuit in the second circuit set, data $D'_{(2, i+1)}$ according to the instruction $I_{(2, i+1)}$ and the second packet header includes: obtaining, by the $(i+1)^{th}$ table lookup unit in the $(i+1)^{th}$ processing circuit in the second circuit set, data $B_{(2, i+1)}$ by means of table lookup; and obtaining, by the $(i+1)^{th}$ instruction executing unit in the $(i+1)^{th}$ processing circuit in the second circuit set, the data $D'_{(2, i+1)}$ according to the instruction $I_{(2, i+1)}$, the data $B_{(2, i+1)}$, and the second packet header.

With reference to the second possible implementation manner of the second aspect, in a third possible implementation manner of the second aspect, the network apparatus further includes an aggregator and a table lookup engine; the obtaining, by the $(i+1)^{th}$ table lookup unit in the $(i+1)^{th}$ processing circuit in the first circuit set, data $B_{(1, i+1)}$ by means of table lookup includes: sending, by the $(i+1)^{th}$ table lookup unit in the $(i+1)^{th}$ processing circuit in the first circuit set, a table lookup request $Q_{(1, i+1)}$ to the aggregator, and receiving the data $B_{(1, i+1)}$ fed back by the aggregator; the obtaining, by the $(i+1)^{th}$ table lookup unit in the $(i+1)^{th}$ processing circuit in the second circuit set, data $B_{(2, i+1)}$ by means of table lookup includes: sending, by the $(i+1)^{th}$ table lookup unit in the $(i+1)^{th}$ processing circuit in the second circuit set, a table lookup request $Q_{(2, i+1)}$ to the aggregator, and receiving the data $B_{(2, i+1)}$ fed back by the aggregator; and the method further includes: after receiving the table lookup request $Q_{(2, i+1)}$ and the table lookup request $Q_{(1, i+1)}$, sending, by the aggregator, the table lookup request $Q_{(2, i+1)}$ or the table lookup request $Q_{(1, i+1)}$ to the table lookup engine, receiving the data $B_{(2, i+1)}$ sent by the table lookup engine in response to the table lookup request $Q_{(2, i+1)}$ or the table lookup request $Q_{(1, i+1)}$, where the table lookup request $Q_{(2, i+1)}$ and the table lookup request $Q_{(1, i+1)}$ include a same table search key value, and the data $B_{(1, i+1)}$ is the same as the data $B_{(2, i+1)}$.

With reference to the second aspect, or the first possible implementation manner of the second aspect, or the second possible implementation manner of the second aspect, or the third possible implementation manner of the second aspect, in a fourth possible implementation manner of the second aspect, the network apparatus further includes an arbiter; and the method further includes: sending, by the arbiter, an instruction sharing indication to the $i^{th}$ processing circuit in the first circuit set when it is determined that the identifier that is of the instruction $I_{(1, i)}$ and included in the data $D_{(1, i-1)}$ is the same as an identifier that is of an instruction $I_{(2, i)}$ and included in the data $D_{(2, i-1)}$, where the sending the instruction $I_{(1, i)}$ to the $i^{th}$ processing circuit in the second circuit set includes: sending, by the $i^{th}$ processing circuit in the first circuit set, the instruction $I_{(1, i)}$ to the $i^{th}$ processing circuit in the second circuit set in response to the instruction sharing indication.

According to a third aspect, a network apparatus is provided, where the network apparatus includes a first circuit set and a second circuit set, where an $i^{th}$ processing circuit in the first circuit set is configured to receive a first packet header and data $D_{(1, i-1)}$, obtain data $D'_{(1, i)}$ based on a first field in the first packet header, and send the first packet header and data $D_{(1, i)}$ to an $(i+1)^{th}$ processing circuit in the first circuit set, where the data $D_{(1, i)}$ is obtained based on the data $D_{(1, i-1)}$ and the data $D'_{(1, i)}$; the $i^{th}$ processing circuit in the first circuit set is further configured to send the data $D_{(1, i)}$ to the $(i+1)^{th}$ processing circuit in the second circuit set; and the $i^{th}$ processing circuit in the second circuit set is configured to send a second packet header to the $(i+1)^{th}$ processing circuit in the second circuit set, where a type and a value of a second field in the second packet header are the same as a type and a value of the first field in the first packet header, and a location of the second field in the second packet header is the same as a location of the first field in the first packet header.

With reference to the third aspect, in a first possible implementation manner of the third aspect, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$; the $(i+1)^{th}$ processing circuit in the first circuit set is further configured to send the instruction $I_{(1, i+1)}$ to the $(i+1)^{th}$ processing circuit in the second circuit set; the $(i+1)^{th}$ processing circuit in the first circuit set is further configured to obtain data $D'_{(1, i+1)}$ according to the instruction $I_{(1, i+1)}$ and the first packet header, and send data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, i+1)}$; and the $(i+1)^{th}$ processing circuit in the second circuit set is configured to obtain data $D'_{(2, i+1)}$ according to the instruction $I_{(1, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$.

With reference to the first possible implementation manner of the third aspect, in a second possible implementation manner of the third aspect, the $(i+2)^{th}$ processing circuit in the first circuit set is configured to obtain an instruction $I_{(1, i+2)}$ based on an identifier that is of the instruction $I_{(1, i+2)}$ and included in the data $D_{(1, i+1)}$, obtain data $D'_{(1, i+2)}$ according to the processing instruction $I_{(1, i+2)}$ and the first packet header, and send the first packet header and data $D_{(1, i+2)}$ to the $(i+3)^{th}$ processing circuit in the first circuit set, where the data $D_{(1, i+2)}$ is obtained based on the data $D_{(1, i+1)}$ and the data $D'_{(1, i+2)}$; and the $(i+2)^{th}$ processing circuit in the second circuit set is configured to obtain an instruction $I_{(2, i+2)}$ based on an identifier that is of the instruction $I_{(2, i+2)}$ and included in the data $D_{(2, i+1)}$, obtain data $D'_{(2, i+2)}$ according to the instruction $I_{(2, i+2)}$ and the second packet header, and send data $D_{(2, i+2)}$ and the second packet header to the $(i+3)^{th}$ processing circuit in the second circuit set, where the data $D_{(2, i+2)}$ is obtained based on the data $D_{(2, i+1)}$ and the data $D'_{(2, i+2)}$.

With reference to the third aspect, in a third possible implementation manner of the third aspect, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$, obtain data $D'_{(1, i+1)}$ according to the processing instruction $I_{(1, i+1)}$ and the first packet header, and send data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, i+1)}$; and the $(i+1)^{th}$ processing circuit in the second circuit set is configured to obtain an instruction $I_{(2, i+1)}$ based on an identifier that is of the instruction $I_{(2, i+1)}$ and included in the data $D_{(2, i)}$, obtain data $D'_{(2, i+1)}$ according to the instruction $I_{(2, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$.

With reference to the third possible implementation manner of the third aspect, in a fourth possible implementation manner of the third aspect, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the $(i+1)^{th}$ table lookup unit in the $(i+1)^{th}$ processing circuit in the first circuit set is configured to obtain data $B_{(1, i+1)}$ by means of table lookup; the $(i+1)^{th}$ instruction executing unit in the $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header; and the $(i+1)^{th}$ table lookup unit in the $(i+1)^{th}$ processing circuit in the second circuit set is configured to obtain data $B_{(2, i+1)}$ by means of table lookup; the $(i+1)^{th}$ instruction executing unit in the $(i+1)^{th}$ processing circuit in the second circuit set is configured to obtain the data $D'_{(2, i+1)}$ according to the instruction $I_{(2, i+1)}$, the data $B_{(2, i+1)}$, and the second packet header.

With reference to the fourth possible implementation manner of the third aspect, in a fifth possible implementation manner of the third aspect, the network apparatus further includes an aggregator and a table lookup engine, where the $(i+1)^{th}$ table lookup unit in the $(i+1)^{th}$ processing circuit in the first circuit set is configured to send a table lookup request $Q_{(1, i+1)}$ to the aggregator, and receive the data $B_{(1, i+1)}$ fed back by the aggregator; the $(i+1)^{th}$ table lookup unit in the $(i+1)^{th}$ processing circuit in the second circuit set is configured to send a table lookup request $Q_{(2, i+1)}$ to the aggregator, and receive the data $B_{(2, i+1)}$ fed back by the aggregator; and the aggregator is configured to; after receiving the table lookup request $Q_{(2, i+1)}$ and the table lookup request $Q_{(1, i+1)}$, send the table lookup request $Q_{(2, i+1)}$ or the table lookup request $Q_{(1, i+1)}$ to the table lookup engine, receive the data $B_{(2, i+1)}$ sent by the table lookup engine in response to the table lookup request $Q_{(2, i+1)}$ or the table lookup request $Q_{(1, i+1)}$, feed back the data $B_{(1, i+1)}$ to the $(i+1)^{th}$ table lookup unit in the $(i+1)^{th}$ processing circuit in the first circuit set, and feed back the data $B_{(2, i+1)}$ to the $(i+1)^{th}$ table lookup unit in the $(i+1)^{th}$ processing circuit in the second circuit set, where the data $B_{(2, i+1)}$ is the same as the data $B_{(1, i+1)}$, and the table lookup request $Q_{(2, i+1)}$ and the table lookup request $Q_{(1, i+1)}$ include a same table search key value.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the network apparatus further includes an arbiter, where: the arbiter is configured to send a data sharing indication to the $i^{th}$ processing circuit in the first circuit set when determining that a type and/or a value of a third field in the second packet header that needs to be processed by the $(i+1)^{th}$ processing circuit in the second circuit set is different from a type and/or a value of a fourth field in the first packet header that needs to be processed by the $(i+1)^{th}$ processing circuit in the first circuit set; and the $i^{th}$ processing circuit in the first circuit set is configured to send the data $D_{(1, i)}$ to the $(i+1)^{th}$ processing circuit in the second circuit set in response to the data sharing indication.

According to a fourth aspect, a network apparatus is provided, where the network apparatus includes a first circuit set and a second circuit set, where an $i^{th}$ processing circuit in the first circuit set is configured to receive a first packet header and data $D_{(1, i-1)}$, obtain an instruction $I_{(1, i)}$ based on an identifier that is of the instruction $I_{(1, i)}$ and included in the data $D_{(1, i-1)}$, and send the instruction $I_{(1, i)}$ to the $i^{th}$ processing circuit in the second circuit set; the $i^{th}$ processing circuit in the first circuit set is further configured to obtain data $D'_{(1, i)}$ according to the instruction $I_{(1, i)}$ and the first packet header; the $i^{th}$ processing circuit in the first circuit set is further configured to send data $D_{(1, i)}$ and the first packet header to an $(i+1)^{th}$ processing circuit in the first circuit set, where the data $D_{(1, i)}$ is obtained based on the data $D_{(1, i-1)}$ and the data $D'_{(1, i)}$; and the $i^{th}$ processing circuit in the second circuit set is configured to receive a second packet header and data $D_{(2, i-1)}$, obtain data $D'_{(2, i)}$ according to the instruction $I_{(1, i)}$ and the second packet header, and send data $D_{(2, i)}$ and the second packet header to the $(i+1)^{th}$ processing circuit in the second circuit set, where the data $D_{(2, i)}$ is obtained based on the data $D'_{(2, i)}$ and the data $D_{(2, i-1)}$.

With reference to the fourth aspect, in a first possible implementation manner of the fourth aspect, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$, obtain data $D'_{(1, i+1)}$ according to the processing instruction $I_{(1, i+1)}$ and the first packet header, and send data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, +1)}$; and the $(i+1)^{th}$ processing circuit in the second circuit set is configured to obtain an instruction $I_{(2, i+1)}$ based on an identifier that is of the instruction $I_{(2, i+1)}$ and included in the data $D_{(2, i)}$, obtain data $D'_{(2, i+1)}$ according to the instruction $I_{(2, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(2, i)}$ and the data $D'_{(2, i+1)}$.

With reference to the first possible implementation manner of the fourth aspect, in a second possible implementation manner of the fourth aspect, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the $(i+1)^{th}$ table lookup unit in the $(i+1)^{th}$ processing circuit in the first circuit set is configured to obtain data $B_{(1, i+1)}$ by means of table lookup; the $(i+1)^{th}$ instruction executing unit in the $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header; and the $(i+1)^{th}$ table lookup unit in the $(i+1)^{th}$ processing circuit in the second circuit set is configured to obtain data $B_{(2, i+1)}$ by means of table lookup; the $(i+1)^{th}$ instruction executing unit in the $(i+1)^{th}$ processing circuit in the second circuit set is configured to obtain the data $D'_{(2,\ i+1)}$ according to the instruction $I_{(2,\ i+1)}$, the data $B_{(2,\ i+1)}$, and the second packet header.

With reference to the second possible implementation manner of the fourth aspect, in a third possible implementation manner of the fourth aspect, the network apparatus further includes an aggregator and a table lookup engine, where the $(i+1)^{th}$ table lookup unit in the $(i+1)^{th}$ processing circuit in the first circuit set is configured to send a table lookup request $Q_{(1,\ i+1)}$ to the aggregator, and receive the data $B_{(1,\ i+1)}$ fed back by the aggregator; the $(i+1)^{th}$ table lookup unit in the $(i+1)^{th}$ processing circuit in the second circuit set is configured to send a table lookup request $Q_{(2,\ i+1)}$ to the aggregator, and receive the data $B_{(2,\ i+1)}$ fed back by the aggregator; and the aggregator is configured to: after receiving the table lookup request $Q_{(2,\ i+1)}$ and the table lookup request $Q_{(1,\ i+1)}$, send the table lookup request $Q_{(2,\ i+1)}$ or the table lookup request $Q_{(1,\ i+1)}$ to the table lookup engine, receive the data $B_{(2,\ i+1)}$ sent by the table lookup engine in response to the table lookup request $Q_{(2,\ i+1)}$ or the table lookup request $Q_{(1,\ i+1)}$, where the table lookup request $Q_{(2,\ i+1)}$ and the table lookup request $Q_{(1,\ i+1)}$ include a same table search key value, and the data $B_{(1,\ i+1)}$ is the same as the data $B_{(2,\ i+1)}$.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the network apparatus further includes an arbiter, where: the arbiter is configured to send an instruction sharing indication to the $i^{th}$ processing circuit in the first circuit set when it is determined that the identifier that is of the instruction $I_{(1,\ i)}$ and included in the data $D_{(1,\ i-1)}$ is the same as an identifier that is of an instruction $I_{(2,\ i)}$ and included in the data $D_{(2,\ i-1)}$; and the $i^{th}$ processing circuit in the second circuit set is configured to send the instruction $I_{(1,\ i)}$ to the $i^{th}$ processing circuit in the second circuit set in response to the instruction sharing indication.

It can be learned that, in some embodiments, a type and a value of a second field in a second packet header are the same as a type and a value of a first field in a first packet header, and a location of the second field in the second packet header is the same as a location of the first field in the first packet header. Therefore, if the first field and the second field are processed in a same manner, a processing result corresponding to the first field is the same as a processing result corresponding to the second field. The $i^{th}$ processing circuit in a first circuit set receives a first packet header and data $D_{(1,\ i-1)}$, obtains data $D'_{(1,\ i)}$ based on the first field in the first packet header, and sends the first packet header and data $D_{(1,\ i)}$ to the $(i+1)^{th}$ processing circuit in the first circuit set. The $i^{th}$ processing circuit in a second circuit set does not need to process the second field in the second packet header in a processing manner the same as a processing manner in which the $i^{th}$ processing circuit in the first circuit set processes the first field in the first packet header. The $(i+1)^{th}$ processing circuit in the second circuit set obtains the data $D_{(1,\ i)}$ by receiving the data $D_{(1,\ i)}$ sent by the $i^{th}$ processing circuit in the first circuit set, that is, by using a processing result sharing mechanism between the foregoing circuit sets, the second circuit set can obtain a processing result provided by the first circuit set. Therefore, the $i^{th}$ processing circuit in the second circuit set may be in an idle state (the second field in the second packet header does not need to be processed) under a specific condition. Therefore, the foregoing technical solutions can help to reduce power consumption, save resources, and improve packet processing efficiency.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

FIG. 1-*a* is a schematic diagram of an architecture of a network apparatus according to an embodiment;

FIG. 1-*b* is a schematic diagram of an architecture of a network apparatus according to an embodiment;

FIG. 1-*c* is a schematic diagram of an architecture of a network apparatus according to an embodiment;

FIG. 1-*d* is a schematic diagram of an architecture of a network apparatus according to an embodiment;

FIG. 1-*e* is a schematic diagram of an architecture of a network apparatus according to an embodiment;

FIG. 3-*a* is a schematic diagram of a state transition among circuit sets according to an embodiment;

FIG. 3-*b* to FIG. 3-*e* are schematic diagrams of another state transition among circuit sets according to an embodiment;

FIG. 3-*f* is a schematic diagram of table lookup aggregation according to an embodiment;

FIG. 3-*g* is a schematic diagram of a failure of table lookup aggregation according to an embodiment;

DETAILED DESCRIPTION OF ILLUSTRATIVE EMBODIMENTS

Figure 2:
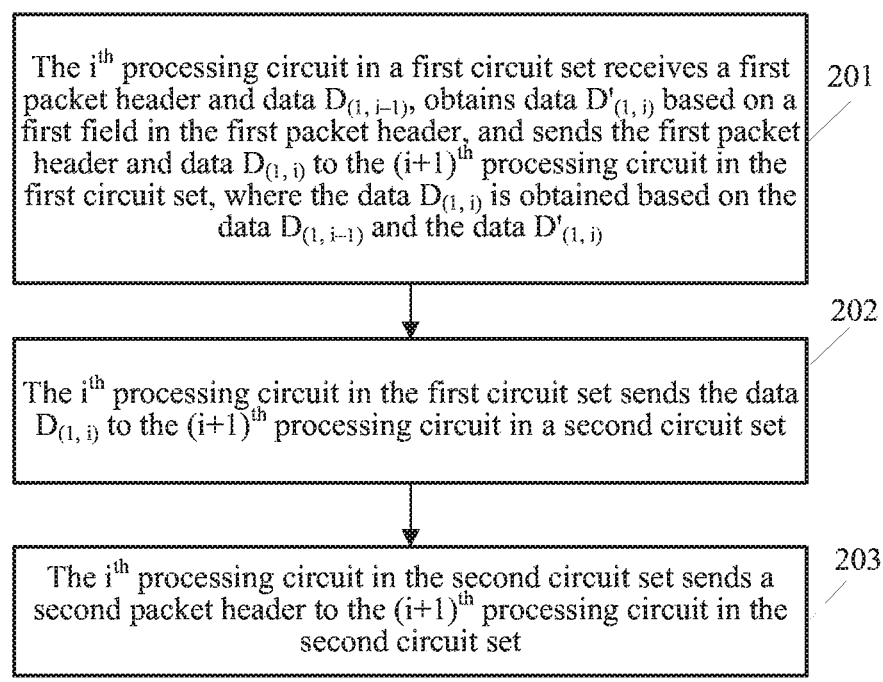
FIG. 2 is a schematic flowchart of a data processing method executed by a network apparatus according to an embodiment.

Embodiments provide a data processing method executed by a network apparatus, and a related device, to increase a utilization rate of a processing resource and reduce packet processing complexity.

The following uses specific embodiments for detailed description.

To make the embodiment objectives, features, and advantages of the present embodiments clearer and more comprehensible, the following clearly describes the technical solutions in the embodiments with reference to the accompanying drawings in the embodiments. Apparently, the embodiments described in the following are merely some but not all of the embodiments. All other embodiments obtained by a person of ordinary skill in the art based on the embodiments without creative efforts shall fall within the protection scope of embodiments.

In the specification, claims, and accompanying drawings of the present embodiments, the terms "first", "second", "third", "fourth", and the like are intended to distinguish between different objects but are not intended to describe a specific order. In addition, the terms "include", "have", and their variations are intended to cover nonexclusive including. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Referring to FIG. 1-$a$, FIG. 1-$b$, FIG. 1-$c$, FIG. 1-$d$, and FIG. 1-$e$, FIG. 1-$a$, FIG. 1-$b$, FIG. 1-$c$, FIG. 1-$d$, and FIG. 1-$e$ are schematic diagrams of architectures of several types of network apparatuses according to an embodiment.

A network apparatus shown in FIG. 1-$a$ includes k circuit sets, and each circuit set includes series processing circuits at multiple levels, where k is a positive integer greater than 1. For example, k may be 2, 3, 5, 8, 10, 20, or another value.

On the basis of an architecture shown in FIG. 1-$a$, a network apparatus shown in FIG. 1-$b$ further includes a packet collector. Assuming that a peak processing capability of the network apparatus is processing k packets in each clock cycle, when the network apparatus does not operate in full load, a quantity of packets received in each clock cycle varies within a range of o to k packets. For at least two circuit sets, if the quantity of packets received in each clock cycle is less than k, a probability of implementing data sharing or instruction sharing may be reduced. The packet collector may be configured to aggregate packets that arrive at different moments and send the aggregated packets, thereby increasing the probability of data sharing or instruction sharing of packets. The packet collector may include a packet input control circuit, a packet buffer, and a packet output control circuit. The packet input control circuit is configured to write packets into the packet buffer in sequence, while the packet output control circuit is configured to read a packet from the buffer according to a set output rule. For example, the packet collector may be considered as an intelligent first in first out queue (FIFO).

On the basis of an architecture shown in FIG. 1-$b$, a network apparatus shown in FIG. 1-$c$ further includes a packet parser, where the packet parser may be configured to parse packets output by the packet collector, to obtain information such as a length of each packet and a consistency between the packets.

On the basis of an architecture shown in FIG. 1-$c$, a network apparatus shown in FIG. 1-$d$ further includes a packet assembler, where the packet assembler may perform assembling on packets based on data that is obtained by processing by the k circuit sets, to obtain to-be-forwarded packets. As shown in FIG. 1-$d$, there is one packet assembler, and as shown in FIG. 1-$e$, there may be multiple packet assemblers, for example, k packet assemblers, where the k circuit sets correspond one-to-one to the k packet assemblers. Certainly, at least two circuit sets may also share one packet assembler; certainly, a packet assembler may also be considered as a processing circuit at the last level in the k circuit sets.

Some solutions in the embodiments may be specifically implemented based on the foregoing architectures, or variation architectures or evolved architectures of the foregoing architectures.

For better understanding of an idea, the following description is made with reference to FIG. 1-$f$. As shown in FIG. 1-$f$, one router includes two circuit sets, and each circuit set includes processing circuits at three levels. Assuming that a packet header a1 and a packet header a2 are respectively input to processing circuits at the first level in the two circuit sets, the processing circuits at the first level send data and a packet header that are obtained by processing by the processing circuits at the first level to processing circuits at the second level, the processing circuits at the second level send data and a packet header that are obtained by processing by the processing circuits at the second level to processing circuits at the third level, and the processing circuits at the third level send data and a packet header that are obtained by processing by the processing circuits at the third level. When the packet header a1 and the packet header a2 have, starting from start positions, identical data of a specific length, data obtained by processing by the processing circuits at the first level in the two circuit sets may be identical, and even data obtained by processing by the processing circuits at the second level or the processing circuits at the third level in the two circuit sets may be identical. In this case, it is possible that the two circuit sets share a processing result at processing circuits at a level or multiple levels in the two circuit sets.

It should be noted that unless otherwise specified, data $D_{(x1, x2)}$, data $D'_{(x1, x2)}$, data $B_{(x1, x2)}$, an instruction $I_{(x1, x2)}$, and an table lookup request $Q_{(x1, x2)}$ involved in the embodiments have the following meanings: the data $D'_{(x1, x2)}$ refers to data obtained by the $x2^{nd}$ processing circuit in a $x1^{st}$ circuit set based on a received packet header; for example, data $D'_{(1, 2)}$ is data obtained by the second processing circuit in a first circuit set based on a received packet header; the data $D_{(x1, x2)}$ refers to data obtained by the $x2^{nd}$ processing circuit in the $x1^{st}$ circuit set based on the data $D'_{(x1, x2)}$, and data $D_{(x1, x2-1)}$ provided by the $(x2-1)^{th}$ processing circuit in the $x1^{st}$ circuit set or data provided by the $(x2-1)^{th}$ processing circuit in another circuit set; for example, data $D_{(2, 3)}$ refers to data obtained by the third processing circuit in a second circuit set based on data $D'_{(2, 3)}$, and data $D_{(2, 2)}$ provided by the second processing circuit in the second circuit set or data provided by the second processing circuit in another circuit set; the instruction $I_{(x1, x2)}$ refers to an instruction executed by the $x2^{nd}$ processing circuit in the $x1^{st}$ circuit set to obtain the data $D'_{(x1, x2)}$; for example, an instruction $I_{(1, 2)}$ refers to an instruction executed by the second processing circuit in the first circuit set to obtain the data $D'_{(1, 2)}$; the table lookup request $Q_{(x1, x2)}$ refers to a table lookup request sent by the $x2^{nd}$ processing circuit in the $x1^{st}$ circuit set; for example, a table lookup request $Q_{(1, 3)}$ refers to a table lookup request sent by the third processing circuit in the first circuit set; and the data $B_{(x1, x2)}$ refers to a table lookup response received by the $x2^{nd}$ processing circuit in the $x1^{st}$ circuit set in response to the table lookup request sent by the $x2^{nd}$ processing circuit in the $x1^{st}$ circuit set; for example, data $B_{(1, 3)}$ refers to a table lookup response received by the third processing circuit in the first circuit set in response to the table lookup request $Q_{(1, 3)}$ sent by the third processing circuit in the first circuit set.

It should be noted that a $y^{th}$ field mentioned in the embodiments may include only one field, or may include multiple fields. For example, a first field may include only one field in a packet header, or may include multiple successive or nonsuccessive fields in the packet header; a second field may include only one field in a packet header, or may include multiple successive or nonsuccessive fields in the packet header. For example, the first field may be a destination IP address field in an Internet Protocol (IP) header; the first field may be a source IP address field and a destination IP address field in an IP header; the first field may be a source IP address field, a destination IP address field, and a protocol field in an IP header, and a source port field and a destination port field in a Transmission Control Protocol (TCP) header; the first field may include all fields in an IP header; the first field may include all fields in an IP header and a TCP header; or the like. For example, the second field may be a source IP address field in an IP header; the second field may be a source IP address field and a destination IP address field in an IP header; the second field may be a source IP address field, a destination IP address field, and a protocol field in the IP header, and a source port field and a destination port field in a TCP header; the second field may include all fields in an IP header; the second field may include all fields in an IP header and a TCP header; or the like.

Unless otherwise specified, the network apparatus mentioned in the embodiments may be a router, a network switch, a packet transport network (PTN) device, a firewall, a load balancer, a data center, or a wavelength division multiplexing (WDM) device. The network switch may be an OpenFlow switch. In addition, the network apparatus mentioned in the embodiments may also be a processor. The processor may be a network processor (NP), where The NP may be a router, a network switch, a PTN device, a firewall, a load balancer, a data center, or a component in a WDM device, and the NP may be implemented by using an application-specific integrated circuit (ASIC), an application-specific instruction set processor (ASIP), or a field programmable gate array (FPGA).

Referring to FIG. 2, FIG. 2 is a schematic flowchart of a data processing method executed by a network apparatus according to an embodiment. The network apparatus includes a first circuit set and a second circuit set. Referring to FIG. 2, the method includes the following steps.

201. An $i^{th}$ processing circuit in the first circuit set receives a first packet header and data $D_{(1, i-1)}$, obtains data $D'_{(1, i)}$ based on a first field in the first packet header, and sends the first packet header and data $D_{(1, i)}$ to an $(i+1)^{th}$ processing circuit in the first circuit set, where the data $D_{(1, i)}$ is obtained based on the data $D_{(1, i-1)}$ and the data $D'_{(1, i)}$.

The first packet header is a packet header of a first packet, where the first packet header may include only an outer header of the first packet, or the first packet header may include an outer header and at least one inner header of the first packet. For example, when the first packet is an IP packet, the first packet header may include an IP header; or the first packet header may include an IP header and a TCP header; or the first packet header may include an IP header and a User Datagram Protocol (UDP) header. For another example, when the first packet is an Ethernet frame, the first packet header may include a Media Access Control (MAC) header; or the first packet header may include a MAC header and an IP header; or the first packet header may include a MAC header, a Multiprotocol Label Switching (MPLS) header, and an IP header; or the first packet header may include a MAC header, an MPLS header, and an IP header, and a TCP header or a UDP header.

A second packet header is a packet header of a second packet, and similarly, the second packet header may include only an outer header of the second packet; or the second packet header may include an outer header and at least one inner header of the second packet. For example, when the second packet is an IP packet, the second packet header may include an IP header, or the second packet header may include an IP header and a TCP header, or the second packet header may include an IP header and a UDP header. For another example, when the second packet is an Ethernet frame, the second packet header may include a MAC header; or the second packet header may include a MAC header and an IP header; or the second packet header may include a MAC header, an MPLS header, and an IP header; or the second packet header may include a MAC header, an MPLS header, an IP header, and a TCP header; or the second packet header may include a MAC header, an MPLS header, an IP header, and a UDP header.

The obtaining the data $D'_{(1, i)}$ based on a first field in the first packet header may include: obtaining the data $D'_{(1, i)}$ according to the first field in the first packet header, where the data $D'_{(1, i)}$ is equal to a value of the first field; or obtaining the data $D'_{(1, i)}$ according to the first field in the first packet header, where the data $D'_{(1, i)}$ is equal to a value that is of a function and obtained by using a value of the first field in the first packet header as a parameter of the function, and the function may be a hash operation, a rounding operation, or a remainder operation; or obtaining the data $D'_{(1, i)}$ according to the first field in the first packet header, where the data $D'_{(1, i)}$ is equal to a search result obtained by performing a search operation by using a value of the first field in the first packet header as a table search key value.

That the data $D_{(1, i)}$ is obtained based on the data $D_{(1, i-1)}$ and the data $D'_{(1, i)}$ may be specifically that: the data $D'_{(1, i)}$ and the data $D_{(1, i-1)}$ are combined to obtain the data $D_{(1, i)}$; or may be that: a part of data is deleted from the data $D_{(1, i-1)}$, and the data $D'_{(1, i)}$ and the data $D_{(1, i-1)}$ from which the part of data is deleted are combined to obtain the data $D_{(1, i)}$; or may be that: the data $D_{(1, i-1)}$ and the data $D'_{(1, i)}$ are used as parameters of a function, and a value of the function is equal to the data $D_{(1, i)}$, where the function may be a hash operation, a rounding operation, or a remainder operation.

202. The $i^{th}$ processing circuit in the first circuit set sends the data $D_{(1, i)}$ to the $(i+1)^{th}$ processing circuit in the second circuit set.

203. The $i^{th}$ processing circuit in the second circuit set sends a second packet header to the $(i+1)^{th}$ processing circuit in the second circuit set.

i is a positive integer. It may be understood that the $i^{th}$ processing circuit in the first circuit set may be the first processing circuit, the second processing circuit, or the third processing circuit in the first circuit set; the $i^{th}$ processing circuit in the second circuit set may be the first processing circuit, the second processing circuit, or the third processing circuit in the second circuit set, where the first circuit set and the second circuit set may be any two circuit sets in the network apparatus.

The first circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

The second circuit set includes the first processing circuit to the $(i+1)^{th}$ processing circuit, where the first processing circuit is a start processing circuit in the second circuit set. In a scenario in which a current processing circuit is an intermediate processing circuit in the second circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

A type and a value of a second field in the second packet header are the same as a type and a value of the first field in the first packet header, and a location of the second field in the second packet header is the same as a location of the first field in the first packet header.

For example, an offset of the second field in the second packet header relative to a start position of the second packet header is equal to an offset of the first field in the first packet header relative to a start position of the first packet header. Specifically, for example, an offset of a most significant bit (MSB) of the second field in the second packet header relative to the start position of the second packet header is 50 bytes, and an offset of an MSB of the first field in the first packet header relative to the start position of the first packet header is also 50 bytes. Alternatively, an offset of the second field in the second packet header relative to an end position of the second packet header is equal to an offset of the first field in the first packet header relative to an end position of the first packet header. For example, an offset of a MSB of the second field in the second packet header relative to the end position of the second packet header is 65 bytes, and an offset of an MSB of the first field in the first packet header relative to the end position of the first packet header is also 65 bytes.

For example, first data in the first packet is equal to second data in the second packet, where the first data is data from the MSB of the first packet header to a least significant bit (LSB) of the first field; and the second data is data from the MSB of the second packet header to an LSB of the second field.

It can be learned that, in this embodiment, a type and a value of a second field in a second packet header are the same as a type and a value of a first field in a first packet header, and a location of the second field in the second packet header is the same as a location of the first field in the first packet header. Therefore, if the first field and the second field are processed in a same processing manner, a processing result corresponding to the first field is the same as a processing result corresponding to the second field. The $i^{th}$ processing circuit in a first circuit set receives a first packet header and data $D_{(1, i-1)}$, obtains data $D'_{(1, i)}$ based on the first field in the first packet header, and sends the first packet header and data $D_{(1, i)}$ to the $(i+1)^{th}$ processing circuit in the first circuit set. The $i^{th}$ processing circuit in a second circuit set does not need to process the second field in the second packet header in a processing manner the same as a processing manner in which the $i^{th}$ processing circuit in the first circuit set processes the first field in the first packet header. The $(i+1)^{th}$ processing circuit in the second circuit set obtains the data $D_{(1, i)}$ by receiving the data $D_{(1, i)}$ sent by the $i^{th}$ processing circuit in the first circuit set, that is, by using a processing result sharing mechanism between the foregoing circuit sets, the second circuit set can obtain a processing result provided by the first circuit set. Therefore, the $i^{th}$ processing circuit in the second circuit set may be in an idle state (the second field in the second packet header does not need to be processed) under a specific condition. Therefore, the foregoing technical solutions can help to reduce power consumption, save resources, and improve packet processing efficiency.

Referring to FIG. 3-a, FIG. 3-a is a schematic diagram of a state transition among a data sharing state, an instruction sharing state, and a shared nothing state. For example, the first circuit set and the second circuit set may change from the data sharing state to the instruction sharing state or the shared nothing state; or the first circuit set and the second circuit set may change from the instruction sharing state to the shared nothing state; or the first circuit set and the second circuit set may remain in the data sharing state, the instruction sharing state, or the shared nothing state all the time. The data sharing state mentioned in the present application means that in two circuit sets, a processing circuit at a level in one circuit set needs to obtain intermediate data according to a field in a packet header, while a processing circuit at the same level in the other circuit set does not need to perform the operation of obtaining intermediate data according to a field in a packet header. For example, an $m^{th}$ processing circuit in the first circuit set needs to obtain intermediate data according to a field in a packet header, while the $m^{th}$ processing circuit in the second circuit set does not need to perform the operation of obtaining intermediate data according to a field in a packet header. In addition, in two circuit sets, if a processing circuit at a level in one circuit set obtains shared data provided by the other circuit set, the data sharing state terminates at the processing circuit at this level. For example, if the $(m+1)^{th}$ processing circuit in the second circuit set receives shared data sent by the $m^{th}$ processing circuit in the first circuit set, the data sharing state between the first circuit set and the second circuit set terminates at the $(m+1)^{th}$ processing circuit (corresponding to a processing circuit at the $(m+1)^{th}$ level).

Referring to FIG. 3-b to FIG. 3-e, FIG. 3-b to FIG. 3-e show a manner in which four circuit sets (four rows of square boxes from top to bottom respectively correspond to a first circuit set to a fourth circuit set) change among the data sharing state, the instruction sharing state, and the shared nothing state at different moments, where a solid line represents the data sharing state, a dashed line represents the instruction sharing state, and a black box represents a processing circuit that currently receives a packet header. FIG. 3-b shows that processing circuits at the first level in the four circuit sets are in the data sharing state. FIG. 3-c shows that processing circuits at the second level in the four circuit sets may be in the instruction sharing state (specifically, it may be that the first circuit set may share an instruction obtained by the first circuit set with the third circuit set or the fourth circuit set). Processing circuits at the second level in the first circuit set and the second circuit set may be in the data sharing state (in the data sharing state, the first circuit set performs an operation of obtaining data $D_{(1, 1)}$ based on a received packet header, and the second circuit set does not perform the operation of obtaining data $D_{(1, 1)}$ based on a received packet header); processing circuits at the second level in the third circuit set and the fourth circuit set may be in the data sharing state (in the data sharing state, the third circuit set performs the operation of obtaining data $D_{(1, 1)}$ based on a received packet header, and the fourth circuit set does not perform the operation of obtaining data $D_{(1, 1)}$ based on a received packet header). FIG. 3-d shows that processing circuits at the third level in the four circuit sets are in the instruction sharing state (specifically, it may be that the fourth circuit set may share an instruction obtained by the fourth circuit set with the first circuit set to the third circuit set). FIG. 3-e shows that processing circuits at the fourth level in the four circuit sets are in the shared nothing state.

Optionally, the network apparatus may further includes an arbiter. The arbiter may decide whether the first circuit set and the second circuit set remain in the data sharing state, the instruction sharing state, or the shared nothing state; or the arbiter may decide whether the first circuit set and second circuit set change from the data sharing state to the instruction sharing state or the shared nothing state, or change from the instruction sharing state to the shared nothing state. Certainly, the arbiter may also be integrated into each processing circuit of the first circuit set and the second circuit set.

Optionally, the data processing method may further include: sending, by the arbiter, a data sharing indication to the $i^{th}$ processing circuit in the first circuit set when determining that a type of a third field in the second packet header that needs to be processed by the $(i+1)^{th}$ processing circuit in the second circuit set is different from a type of a fourth field in the first packet header that needs to be processed by the $(i+1)^{th}$ processing circuit in the first circuit set; or sending, by the arbiter, a data sharing indication to the $i^{th}$ processing circuit in the first circuit set when it is determined that a value of a third field in a second packet header that needs to be processed by the $(i+1)^{th}$ processing circuit in the second circuit set is different from a value of a fourth field in a first packet header that needs to be processed by the $(i+1)^{th}$ processing circuit in the first circuit set; or sending, by the arbiter, a data sharing indication to the $i^{th}$ processing circuit in the first circuit set when determining that a type of a third field in the second packet header that needs to be processed by the $(i+1)^{th}$ processing circuit in the second circuit set is different from a type of a fourth field in the first packet header that needs to be processed by the $(i+1)^{th}$ processing circuit in the first circuit set and that a value of a third field in the second packet header that needs to be processed by the $(i+1)^{th}$ processing circuit in the second circuit set is different from a value of a fourth field in the first packet header that needs to be processed by the $(i+1)^{th}$ processing circuit in the first circuit set. That the $i^{th}$ processing circuit in the first circuit set sends the data $D_{(1, i)}$ to the $(i+1)^{th}$ processing circuit in the second circuit set may include that: the $i^{th}$ processing circuit in the first circuit set sends the data $D_{(1, i)}$ to the $(i+1)^{th}$ processing circuit in the second circuit set in response to the data sharing indication.

Further, the data processing method may further include: obtaining, by the $(i+1)^{th}$ processing circuit in the first circuit set, an instruction $I_{(1, i+1)}$ based on an identifier that is of the instruction $I_{(1, i+1)}$ and included in the data $D_{(1, i)}$; sending, by the $(i+1)^{th}$ processing circuit in the first circuit set, the instruction $I_{(1, +1)}$ to the $(i+1)^{th}$ processing circuit in the second circuit set; obtaining, by the $(i+1)^{th}$ processing circuit in the first circuit set, data $D'_{(1, i+1)}$ according to the instruction $I_{(1, i+1)}$ and the first packet header, and sending data $D_{(1, i+1)}$ and the first packet header to an $(i+2)^{th}$ processing circuit in the first circuit set, where the data $D_{(1, i+1)}$ is obtained based on the data $D_{(1, i)}$ and the data $D'_{(1, i+1)}$, and that the data $D_{(1, i+1)}$ is obtained based on the data $D_{(1, i)}$ and the data $D'_{(1, i+1)}$ may be specifically that: the data $D'_{(1, i+1)}$ and the data $D_{(1, i)}$ are combined to obtain the data $D_{(1, i+1)}$; or may be that: a part of data is deleted from the data $D_{(1, i)}$, and the data $D'_{(1, i+1)}$ and the data $D_{(1, i)}$ from which the part of data is deleted are combined to obtain the data $D_{(1, i+1)}$; and obtaining, by the $(i+1)^{th}$ processing circuit in the second circuit set, data $D'_{(2, i+1)}$ according to the instruction $I_{(1, i-1)}$ and the second packet header, and sending data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$. In the foregoing example scenario, the first circuit set and the second circuit set change from the data sharing state to the instruction sharing state, and in the instruction sharing state, the $(i+1)^{th}$ processing circuit in the first circuit set shares the obtained instruction with the $(i+1)^{th}$ processing circuit in the second circuit set.

Instruction sharing is implemented between the $(i+1)^{th}$ processing circuit in the first circuit set and the $(i+1)^{th}$ processing circuit in the second circuit set; therefore, instruction fetch bandwidth occupied by the $(i+1)^{th}$ processing circuit in the second circuit is reduced. Certainly, if it is assumed that the data $D_{(1, i)}$ does not include the identifier of the instruction $I_{(1, i+1)}$, the $(i+1)^{th}$ processing circuit in the first circuit set and the $(i+1)^{th}$ processing circuit in the second circuit set may not perform instruction sharing between each other.

Further, the data processing method may further include: obtaining, by the $(i+2)^{th}$ processing circuit in the first circuit set, an instruction $I_{(1, i+2)}$ based on an identifier that is of the instruction $I_{(1, i+2)}$ and included in the data $D_{(1, i+1)}$, obtaining data $D'_{(1, i+2)}$ according to the processing instruction $I_{(1, i+2)}$ and the first packet header, and sending the first packet header and data $D_{(1, i+2)}$ to the $(i+3)^{th}$ processing circuit in the first circuit set, where the data $D_{(1, i+2)}$ is obtained based on the data $D_{(1, i+1)}$ and the data $D'_{(1, i+2)}$; and obtaining, by the $(i+2)^{th}$ processing circuit in the second circuit set, an instruction $I_{(2, i+2)}$ based on an identifier that is of the instruction $I_{(2, i+2)}$ and included in the data $D_{(2, i+1)}$, obtaining data $D'_{(2, i+2)}$ according to the instruction $I_{(2, i+2)}$ and the second packet header, and sending data $D_{(2, i+2)}$ and the second packet header to the $(i+3)^{th}$ processing circuit in the second circuit set, where the data $D_{(2, i+2)}$ is obtained based on the data $D_{(2, i+1)}$ and the data $D'_{(2, i+2)}$. In the foregoing example scenario, the first circuit set and the second circuit set change from the instruction sharing state to the shared nothing state, and in the shared nothing state, the $(i+2)^{th}$ processing circuit in the first circuit set and the $(i+2)^{th}$ processing circuit in the second circuit set separately perform processing. The $(i+2)^{th}$ processing circuit in the first circuit set and the $(i+2)^{th}$ processing circuit in the second circuit perform neither data sharing nor instruction sharing between each other.

For another example, the data processing method may further include: obtaining, by the $(i+1)^{th}$ processing circuit in the first circuit set, an instruction $I_{(1, i+1)}$ based on an identifier that is of the instruction $I_{(1, i+1)}$ and included in the data $D_{(1, i)}$, obtaining data $D'_{(1, i+1)}$ according to the processing instruction $I_{(1, i+1)}$ and the first packet header, and sending data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, +1)}$; and obtaining, by the $(i+1)^{th}$ processing circuit in the second circuit set, an instruction $I_{(2, i+1)}$ based on an identifier that is of the instruction $I_{(2, i+1)}$ and included in the data $D_{(1, i)}$, obtaining data $D'_{(2, i+1)}$ according to the instruction $I_{(2, i+1)}$ and the second packet header, and sending data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$. In the foregoing example scenario, the first circuit set and the second circuit set change from the instruction sharing state to the shared nothing state, and in the shared nothing state, the $(i+1)^{th}$ processing circuit in the first circuit set and the $(i+1)^{th}$ processing circuit in the second circuit set separately perform processing. The $(i+1)^{th}$ processing circuit in the first circuit set and the $(i+1)^{th}$ processing circuit in the second circuit perform neither data sharing nor instruction sharing between each other.

Optionally, the $(i+1)^{th}$ processing circuit in the first circuit set may include the $(i+1)^{th}$ table lookup unit and the $(i+1)^{th}$ instruction executing unit, and the $(i+1)^{th}$ processing circuit in the second circuit set may include the $(i+1)^{th}$ table lookup unit and the $(i+1)^{th}$ instruction executing unit. Certainly, some or all of processing circuits in the first circuit set and the second circuit set may each include both a table lookup unit and an instruction executing unit. For example, the $i^{th}$ processing circuit in the first circuit set may include the $i^{th}$ table lookup unit and the $i^{th}$ instruction executing unit; the $(i+2)^{th}$ processing circuit in the first circuit set may include the $(i+2)^{th}$ table lookup unit and the $(i+2)^{th}$ instruction executing unit; and the rest can be deduced by analogy.

The obtaining, by the $(i+1)^{th}$ processing circuit in the first circuit set, data $D'_{(1, i+1)}$ according to the instruction $I_{(1, i+1)}$ and the first packet header may include: obtaining, by the $(i+1)^{th}$ table lookup unit in the $(i+1)^{th}$ processing circuit in the first circuit set, data $B_{(1, i+1)}$ by means of table lookup; and obtaining, by the $(i+1)^{th}$ instruction executing unit in the $(i+1)^{th}$ processing circuit in the first circuit set, the data $D'_{(1, i+1)}$ according to the instruction $I_{(1, i+1)}$, the data $B_{(1, i+1)}$, and the first packet header.

The obtaining, by the $(i+1)^{th}$ processing circuit in the second circuit set, data $D'_{(2, i+1)}$ according to the instruction $I_{(2, i+1)}$ and the second packet header includes: obtaining, by the $(i+1)^{th}$ table lookup unit in the $(i+1)^{th}$ processing circuit in the second circuit set, data $B_{(2, i+1)}$ by means of table lookup; and obtaining, by the $(i+1)^{th}$ instruction executing unit in the $(i+1)^{th}$ processing circuit in the second circuit set, the data $D'_{(2, i+1)}$ according to the instruction $I_{(2, i+1)}$, the data $B_{(2, i+1)}$, and the second packet header.

Optionally, the network apparatus further includes an aggregator and a table lookup engine; the obtaining, by the $(i+1)^{th}$ table lookup unit in the $(i+1)^{th}$ processing circuit in the first circuit set, data $B_{(1, i+1)}$ by means of table lookup may include: sending, by the $(i+1)^{th}$ table lookup unit in the $(i+1)^{th}$ processing circuit in the first circuit set, a table lookup request $Q_{(1, i+1)}$ to the aggregator, and receiving the data $B_{(1, i+1)}$ fed back by the aggregator.

The obtaining, by the $(i+1)^{th}$ table lookup unit in the $(i+1)^{th}$ processing circuit in the second circuit set, data $B_{(2, i+1)}$ by means of table lookup may include: sending, by the $(i+1)^{th}$ table lookup unit in the $(i+1)^{th}$ processing circuit in the second circuit set, a table lookup request $Q_{(2, i+1)}$ to the aggregator, and receiving, by the $(i+1)^{th}$ table lookup unit in the $(i+1)^{th}$ processing circuit in the second circuit set, the data $B_{(2, i+1)}$ fed back by the aggregator.

The data processing method may further include: after receiving the table lookup request $Q_{(2, i+1)}$ and the table lookup request $Q_{(1, i+1)}$, sending, by the aggregator, the table lookup request $Q_{(2, i+1)}$ or the table lookup request $Q_{(1, i+1)}$ to the table lookup engine, receiving the data $B_{(2, i+1)}$ sent by the table lookup engine in response to the table lookup request $Q_{(2, i+1)}$ or the table lookup request $Q_{(1, i+1)}$, feeding back the data $B_{(1, i+1)}$ to the $(i+1)^{th}$ table lookup unit in the $(i+1)^{th}$ processing circuit in the first circuit set, and feeding back the data $B_{(2, i+1)}$ to the $(i+1)^{th}$ table lookup unit in the $(i+1)^{th}$ processing circuit in the second circuit set, where the table lookup request $Q_{(2, i+1)}$ and the table lookup request $Q_{(1, i+1)}$ include a same table search key value, and the data $B_{(2, i+1)}$ is the same as the data $B_{(1, i+1)}$.

It can be learned that when table search key values that are included in multiple table lookup requests received by an aggregator are the same, the aggregator may aggregate the multiple table lookup requests into one table lookup request, request table lookup data from a table lookup engine by using the table lookup request, make multiple copies of the table lookup data fed back by the table lookup engine, and provide the multiple copies of the table lookup data to multiple table lookup units that initiate the table lookup requests. Referring to FIG. 3-f, FIG. 3-f is a schematic diagram of aggregating table lookup requests by an aggregator. The table lookup engine is introduced to conditionally aggregate table lookup requests, which helps to greatly reduce a quantity of times the table lookup engine is accessed, avoid table lookup engine congestion as much as possible, and reduce occupation of table lookup bandwidth; and further helps to improve response efficiency of the table lookup engine. Referring to FIG. 3-g, FIG. 3-g is another schematic diagram of aggregating table lookup requests by an aggregator. In FIG. 3-g, an example is used to show that when the aggregator fails to aggregate the table lookup requests, the aggregator transparently transmits data exchanged between the table lookup engine and the table lookup units.

Figure 4:
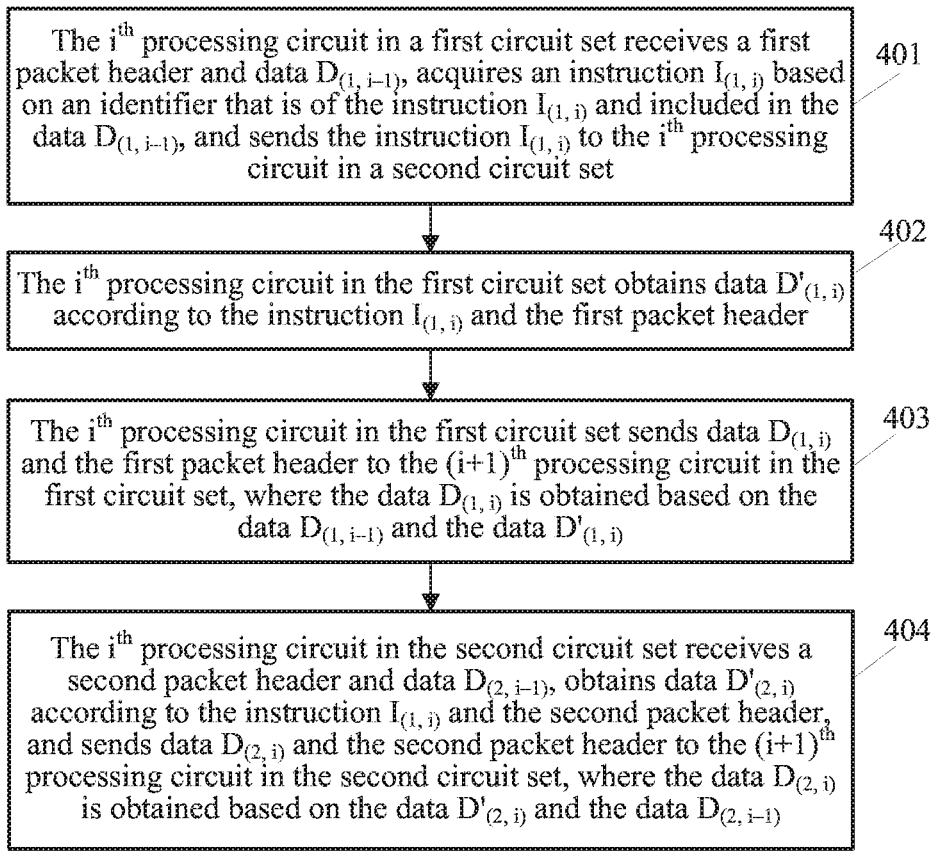
FIG. 4 is a schematic flowchart of another data processing method executed by a network apparatus according to an embodiment.

Referring to FIG. 4, an embodiment further provides a data processing method executed by a network apparatus, where the network apparatus includes a first circuit set and a second circuit set, and the data processing method includes the following steps.

401. An $i^{th}$ processing circuit in the first circuit set receives a first packet header and data $D_{(1, i-1)}$, obtains an instruction $I_{(1, i)}$ based on an identifier that is of the instruction $I_{(1, i)}$ and included in the data $D_{(1, i-1)}$, and sends the instruction $I_{(1, i)}$ to the $i^{th}$ processing circuit in the second circuit set.

402. The $i^{th}$ processing circuit in the first circuit set obtains data $D'_{(1, i)}$ according to the instruction $I_{(1, i)}$ and the first packet header.

For example, the $i^{th}$ processing circuit in the first circuit set may obtain the data $D'_{(1, i)}$ according to the instruction $I_{(1, i)}$ and a first field in the first packet header.

403. The $i^{th}$ processing circuit in the first circuit set sends data $D_{(1, i)}$ and the first packet header to an $(i+1)^{th}$ processing circuit in the first circuit set, where the data $D_{(1, i)}$ is obtained based on the data $D_{(1, i-1)}$ and the data $D'_{(1, i)}$.

404. The $i^{th}$ processing circuit in the second circuit set receives a second packet header and data $D_{(2, i-1)}$, obtains data $D'_{(2, i)}$ according to the instruction $I_{(1, i)}$ and the second packet header, and sends data $D_{(2, i)}$ and the second packet header to the $(i+1)^{th}$ processing circuit in the second circuit set, where the data $D_{(2, i)}$ is obtained based on the data $D'_{(2, i)}$ and the data $D_{(2, i-1)}$.

For example, the $i^{th}$ processing circuit in the second circuit set may obtain the data $D'_{(2, i)}$ according to the instruction $I_{(1, i)}$ and a second field in the second packet header.

i is a positive integer. It may be understood that the $i^{th}$ processing circuit in the first circuit set may be the first processing circuit, the second processing circuit, or the third processing circuit in the first circuit set; the $i^{th}$ processing circuit in the second circuit set may be the first processing circuit, the second processing circuit, or the third processing circuit in the second circuit set, where the first circuit set and the second circuit set may be any two circuit sets in the network apparatus.

The first circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

The second circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

Obtaining data $D'_{(1,\ i)}$ based on the first field in the first packet header may include: obtaining the data $D'_{(1,\ i)}$ according to the first field in the first packet header, where the data $D'_{(1,\ i)}$ is equal to a value of the first field; or obtaining the data $D'_{(1,\ i)}$ according to the first field in the first packet header, where the data $D'_{(1,\ i)}$ is equal to a value that is of a function and obtained by using a value of the first field in the first packet header as a parameter of the function, and the function may be a hash operation, a rounding operation, or a remainder operation; or obtaining the data $D'_{(1,\ i)}$ according to the first field in the first packet header, where the data $D'_{(1,\ i)}$ is equal to a search result obtained by performing a search operation by using a value of the first field in the first packet header as a table search key value.

That the data $D_{(1,\ i)}$ is obtained based on the data $D_{(1,\ i-1)}$ and the data $D'_{(1,\ i)}$ may be specifically that: the data $D'_{(1,\ i)}$ and the data $D_{(1,\ i-1)}$ are combined to obtain the data $D_{(1,\ i)}$; or may be that: a part of data is deleted from the data $D_{(1,\ i-1)}$, and the data $D'_{(1,\ i)}$ and the data $D_{(1,\ i-1)}$ from which the part of data is deleted are combined to obtain the data $D_{(1,\ i)}$; or may be that: the data $D_{(1,\ i-1)}$ and the data $D'_{(1,\ i)}$ are used as parameters of a function, and a value of the function is equal to the data $D_{(1,\ i)}$, where the function may be a hash operation, a rounding operation, a remainder operation, or the like.

The first packet header is a packet header of a first packet, where the first packet header may include only an outer header of the first packet, or the first packet header may include an outer header and at least one inner header of the first packet. For example, when the first packet is an IP packet, the first packet header may include an IP header, or the first packet header may include an IP header and a TCP header, or the first packet header may include an IP header and a UDP header. For another example, when the first packet is an Ethernet frame, the first packet header may include a MAC header; or the first packet header may include a MAC header and an IP header; or the first packet header may include a MAC header, an MPLS header, and an IP header; or the first packet header may include a MAC header, an MPLS header, an IP header, and a TCP header or a UDP header.

The second packet header is a packet header of a second packet, and similarly, the second packet header may include only an outer header of the second packet, or the second packet header may include an outer header and at least one inner header of the second packet. For example, when the second packet is an IP packet, the second packet header may include an IP header, or the second packet header may include an IP header and a TCP header, or the second packet header may include an IP header and a UDP header. For another example, when the second packet is an Ethernet frame, the second packet header may include a MAC header; or the second packet header may include a MAC header and an IP header; or the second packet header may include a MAC header, an MPLS header, and an IP header; or the second packet header may include a MAC header, an MPLS header, an IP header, and a TCP header; or the second packet header may include a MAC header, an MPLS header, an IP header, and a UDP header.

It can be learned that, in this embodiment, the $i^{th}$ processing circuit in a first circuit set shares an instruction $I_{(1,\ i)}$ with the $i^{th}$ processing circuit in a second circuit set, so that the $i^{th}$ processing circuit in the second circuit set may obtain data $D'_{(2,\ i)}$ according to the instruction $I_{(1,\ i)}$ and a received second packet header. An instruction sharing mechanism between circuit sets is introduced, so that some of processing circuits in some circuit sets in the network apparatus may be exempted from reading instructions from instruction memories of the processing circuits. This helps to reduce usage of the instruction memories, and reduce occupation of instruction fetch bandwidth; this also helps to increase a resource utilization rate and reduce packet forwarding processing complexity.

Optionally, the network apparatus may further include an arbiter, where the arbiter may decide whether the first circuit set and the second circuit set remain in an instruction sharing state or a shared nothing state, or the arbiter may decide whether the first circuit set and the second circuit set change from the instruction sharing state to the shared nothing state. Certainly, the arbiter may also be integrated into each processing circuit in the first circuit set and the second circuit set.

The data processing method further includes: sending, by the arbiter, an instruction sharing indication to the $i^{th}$ processing circuit in the first circuit set when it is determined that the identifier that is of the instruction $I_{(1,\ i)}$ and included in the data $D_{(1,\ i-1)}$ is the same as an identifier that is of an instruction $I_{(2,\ i)}$ and included in the data $D_{(2,\ i-1)}$. The sending the instruction $I_{(1,\ i)}$ to the $i^{th}$ processing circuit in the second circuit set may include: sending, by the $i^{th}$ processing circuit in the first circuit set, the instruction $I_{(1,\ i)}$ to the $i^{th}$ processing circuit in the second circuit set in response to the instruction sharing indication.

Further, the data processing method further includes: obtaining, by the $(i+1)^{th}$ processing circuit in the first circuit set, an instruction $I_{(1,\ i+1)}$ based on an identifier that is of the instruction $I_{(1,\ i+1)}$ and included in the data $D_{(1,\ i)}$, obtaining data $D'_{(1,\ i+1)}$ according to the processing instruction $I_{(1,\ i+1)}$ and the first packet header, and sending data $D_{(1,\ i+1)}$ and the first packet header to an $(i+2)^{th}$ processing circuit in the first circuit set, where the data $D_{(1,\ i+1)}$ is obtained based on the data $D_{(1,\ i)}$ and the data $D'_{(1,\ i+1)}$; and obtaining, by the $(i+1)^{th}$ processing circuit in the second circuit set, an instruction $I_{(2,\ i+1)}$ based on an identifier that is of the instruction $I_{(2,\ i+1)}$ and included in the data $D_{(2,\ i)}$, obtaining data $D'_{(2,\ i+1)}$ according to the instruction $I_{(2,\ i+1)}$ and the second packet header, and sending data $D_{(2,\ i+1)}$ and the second packet header to the $(i+2)^{th}$ processing circuit in the second circuit set, where the data $D_{(2,\ i+1)}$ is obtained based on the data $D_{(1,\ i)}$ and the data $D'_{(2,\ i+1)}$. In the foregoing example scenario, the first circuit set and the second circuit set change from the instruction sharing state to the shared nothing state, and in the shared nothing state, the $(i+2)^{th}$ processing circuit in the first circuit set and the $(i+2)^{th}$ processing circuit in the second circuit set separately perform processing. The $(i+2)^{th}$ processing circuit in the first circuit set and the $(i+2)^{th}$ processing circuit in the second circuit set perform neither data sharing nor instruction sharing between each other.

Optionally, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set may include an $(i+1)^{th}$ table lookup unit and an $(i+1)^{th}$ instruction executing unit. Certainly, some or all of processing circuits in the first circuit set and the second circuit set may each include both a table lookup unit and an instruction executing unit. For example, the $i^{th}$ processing circuit in the first circuit set may include the $i^{th}$ table lookup unit and the $i^{th}$ instruction executing unit; the $(i+2)^{th}$ processing circuit in the first circuit set may include the $(i+2)^{th}$ table lookup unit and the $(i+2)^{th}$ instruction executing unit; and the rest can be deduced by analogy.

The obtaining, by the $(i+1)^{th}$ processing circuit in the first circuit set, data $D'_{(1, i+1)}$ according to the instruction $I_{(1, i+1)}$ and the first packet header includes: obtaining, by the $(i+1)^{th}$ table lookup unit in the $(i+1)^{th}$ processing circuit in the first circuit set, data $B_{(1, i+1)}$ by means of table lookup; and obtaining, by the $(i+1)^{th}$ instruction executing unit in the $(i+1)^{th}$ processing circuit in the first circuit set, the data $D'_{(1, i+1)}$ according to the instruction $I_{(1, i+1)}$, the data $B_{(1, i+1)}$, and the first packet header.

The obtaining, by the $(i+1)^{th}$ processing circuit in the second circuit set, data $D'_{(2, i+1)}$ according to the instruction $I_{(2, i+1)}$ and the second packet header includes: obtaining, by the $(i+1)^{th}$ table lookup unit in the $(i+1)^{th}$ processing circuit in the second circuit set, data $B_{(2, i+1)}$ by means of table lookup; and obtaining, by the $(i+1)^{th}$ instruction executing unit in the $(i+1)^{th}$ processing circuit in the second circuit set, the data $D'_{(2, i+1)}$ according to the instruction $I_{(2, i+1)}$, the data $B_{(2, i+1)}$, and the second packet header.

Optionally, the network apparatus may further include an aggregator and a table lookup engine; the obtaining, by the $(i+1)^{th}$ table lookup unit in the $(i+1)^{th}$ processing circuit in the first circuit set, data $B_{(1, i+1)}$ by means of table lookup includes: sending, by the $(i+1)^{th}$ table lookup unit in the $(i+1)^{th}$ processing circuit in the first circuit set, a table lookup request $Q_{(1, i+1)}$ to the aggregator, and receiving the data $B_{(1, i+1)}$ fed back by the aggregator; and the obtaining, by the $(i+1)^{th}$ table lookup unit in the $(i+1)^{th}$ processing circuit in the second circuit set, data $B_{(2, i+1)}$ by means of table lookup includes: sending, by the $(i+1)^{th}$ table lookup unit in the $(i+1)^{th}$ processing circuit in the second circuit set, a table lookup request $Q_{(2, i+1)}$ to the aggregator, and receiving the data $B_{(2, i+1)}$ fed back by the aggregator.

The data processing method further includes: after receiving the table lookup request $Q_{(2, i+1)}$ and the table lookup request $Q_{(1, i+1)}$, sending, by the aggregator, the table lookup request $Q_{(2, i+1)}$ or the table lookup request $Q_{(1, i+1)}$ to the table lookup engine, receiving the data $B_{(2, i+1)}$ sent by the table lookup engine in response to the table lookup request $Q_{(2, i+1)}$ or the table lookup request $Q_{(1, i+1)}$, where the table lookup request $Q_{(2, i+1)}$ and the table lookup request $Q_{(1, i+1)}$ include a same table search key value, and the data $B_{(1, i+1)}$ is the same as the data $B_{(2, i+1)}$.

It can be learned that when table search key values that are included in multiple table lookup requests received by an aggregator are the same, the aggregator may aggregate the multiple table lookup requests into one table lookup request, request table lookup data from a table lookup engine by using the table lookup request, make multiple copies of the table lookup data fed back by the table lookup engine, and provide the multiple copies of the table lookup data to multiple table lookup units that initiate the table lookup requests. The table lookup engine is introduced to conditionally aggregate table lookup requests, which helps to greatly reduce a quantity of times the table lookup engine is accessed; and avoid table lookup engine congestion as much as possible; and further helps to improve response efficiency of the table lookup engine.

To better understand the foregoing technical solutions, some specific application scenarios are used as examples for description in the following.

Figure 5:
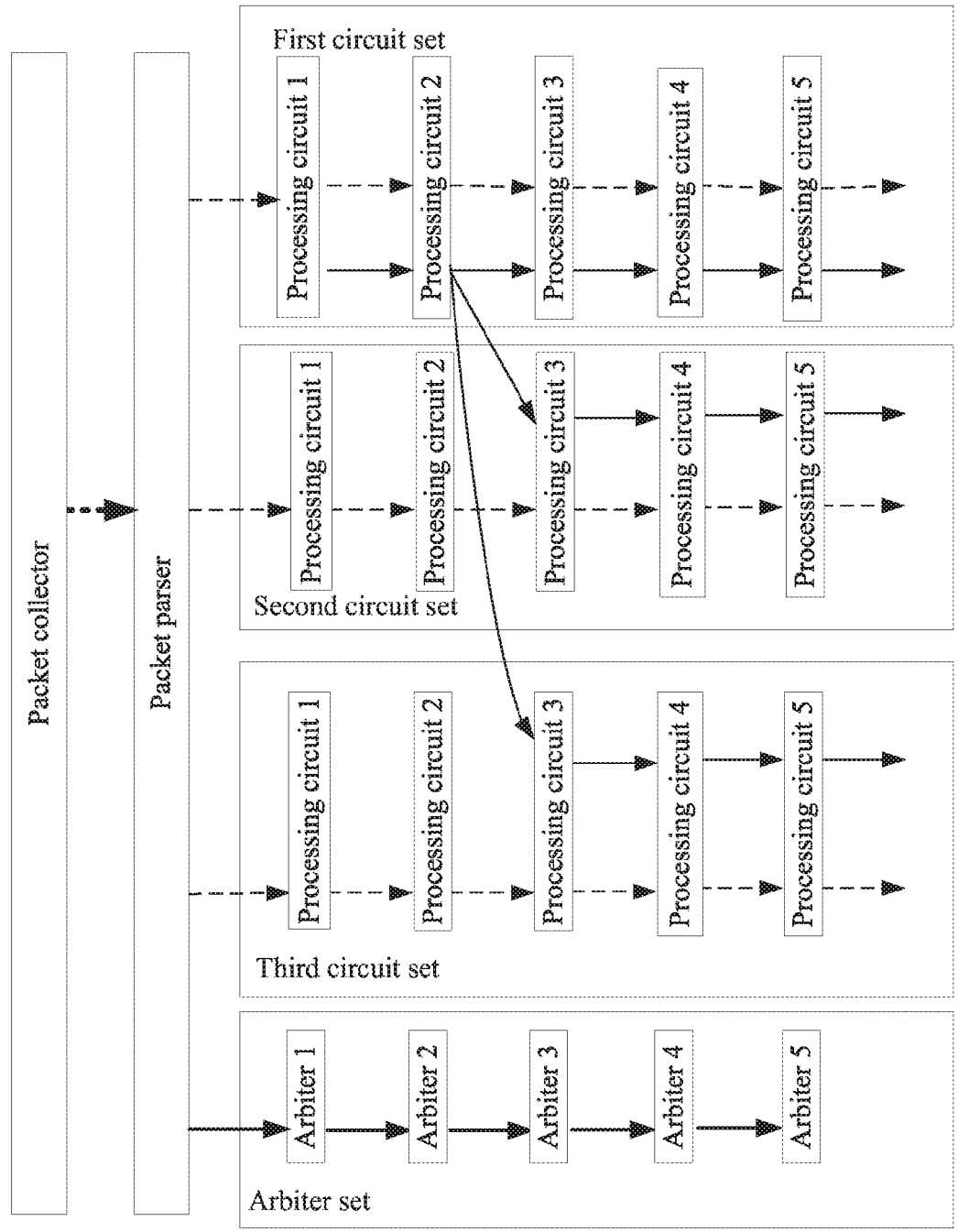
FIG. 5 is a schematic diagram of another network apparatus according to an embodiment.

Referring to FIG. 5, FIG. 5 shows an architecture diagram of a packet forwarding processing device. The packet forwarding processing device shown in FIG. 5 includes a packet collector, a packet parser, a first circuit set, a second circuit set, a third circuit set, and an arbiter set. The first circuit set, the second circuit set, the third circuit set, and the arbiter set each include circuits at five levels; and it is assumed that a processing circuit at each level in the first circuit set, the second circuit set, and the third circuit set processes only one packet header.

The following describes a process during which each circuit processes a packet.

The packet collector can buffer a received packet; and when waiting time exceeds a threshold (for example, three clock cycles), the packet collector sends three buffered packets, that is, a packet f1, a packet f2, and a packet f3 to the packet parser.

The packet parser receives the packet f1, the packet f2, and the packet f3; the packet parser parses a packet header f11 of the packet f1, a packet header f21 of the packet f2, and a packet header f31 of the packet f3, to obtain information about lengths of the packet header f11, the packet header f21, and the packet header f31, and obtain information about consistency between the packet header f11, the packet header f21, and the packet header f31. The information about the consistency between the packet header f11, the packet header f21, and the packet header f31 indicates a quantity and/or lengths of fields whose types and values are the same, from a start position of the packet header f11, the packet header f21, and the packet header f31.

Figure 6:
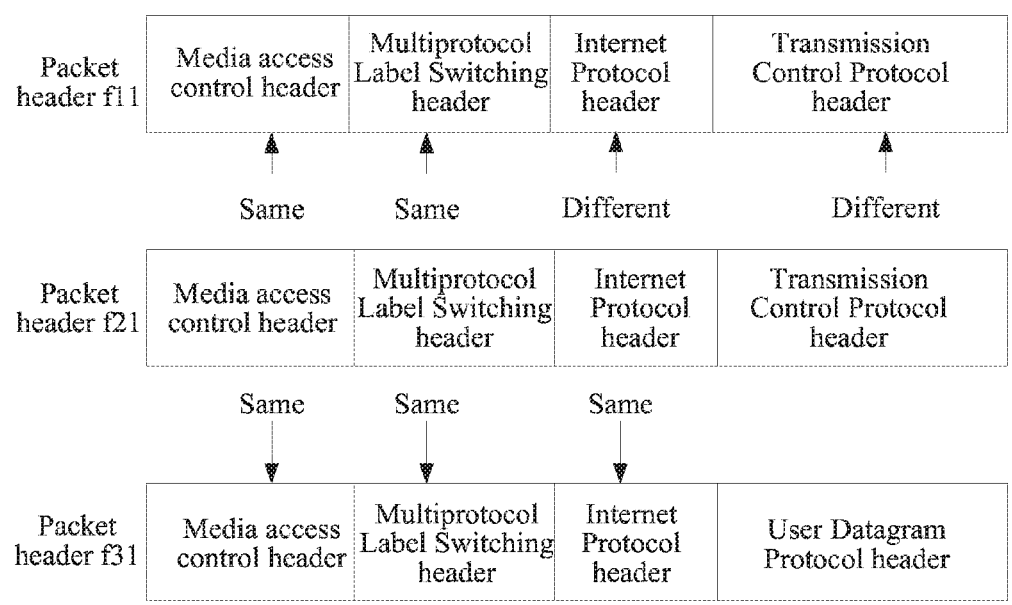
FIG. 6 is a schematic diagram of a packet header according to an embodiment.

If it is assumed that the packet f1, the packet f2, and the packet f3 are Ethernet frames, as shown in FIG. 6, the packet header f11 includes a MAC header, an MPLS header, an IP header, and a TCP header of the packet f1; the packet header f21 includes a MAC header, an MPLS header, an IP header, and a TCP header of the packet f2; and the packet header f31 includes a MAC header, an MPLS header, an IP header, and a UDP header of the packet f3.

It is assumed that the MAC headers of the packet header f11, the packet header f21, and the packet header f31 are the same, the MPLS headers of the packet header f11, the packet header f21, and the packet header f31 are the same, the IP headers of the packet header f11 and the packet header f21 are different (for example, values of source IP address fields and/or destination IP address fields in the IP headers are different), and the IP headers of the packet header f21 and the packet header f31 are the same.

The packet parser sends the packet header f11 to the first processing circuit in the first circuit set; the packet parser sends the packet header f21 to the first processing circuit in the second circuit set; the packet parser sends the packet header f31 to the first processing circuit in the third circuit set.

The packet parser sends the information about the consistency between the packet header f11, the packet header f21, and the packet header f31, or information about consistency between two packet headers to the first arbiter in an arbiter set. It is assumed that the information about the consistency indicates that types and values of the first two packet headers (a MAC header and an MPLS header) of the packet header f11, the packet header f21, and the packet header f31 are the same, and types and values of the first three packet headers (a MAC header, an MPLS header, and an IP header) of the packet header f11, the packet header f21, and the packet header f31 are the same.

Based on the information about the consistency, the first arbiter determines that a type, a value, and a location in the packet header f11 that are of the MAC header in the packet header f11 that needs to be processed by the first processing circuit in the first circuit set are the same as a type, a value, and a location in the packet header f21 that are of the MAC header in the packet header f21 that needs to be processed by the first processing circuit in the second circuit set, and are also the same as a type, a value, and a location in the packet header f31 that are of the MAC header in the packet header f31 that needs to be processed by the first processing circuit in the third circuit set. That is, the first processing circuit in the second circuit set and the first processing circuit in the third circuit set may use intermediate data obtained by the first processing circuit in the first circuit set based on the packet header f11. Therefore, the first arbiter sends an operation indicator to the first processing circuit in the first circuit set, and the first arbiter sends an idle indicator to the first processing circuit in the second circuit set and the first processing circuit in the third circuit set.

A processing circuit that receives the idle indicator from the arbiter does not perform an operation of processing a field in a received packet header to obtain intermediate data, but transparently transmits the received packet header. A processing circuit that receives the operation indicator from the arbiter performs processing on a field in a received packet header to obtain intermediate data, and sends the packet header and the intermediate data to a processing circuit at a next level.

After receiving the operation indicator from the first arbiter, the first processing circuit in the first circuit set obtains data $D_{(1, 1)}$ based on a MAC header in the packet header f11, and sends the packet header f11 and the data $D_{(1, 1)}$ to the second processing circuit in the first circuit set. After receiving the idle indicator from the first arbiter, the first processing circuit in the second circuit set sends the packet header f21 to the second processing circuit in the second circuit set. Similarly, after receiving the idle indicator from the first arbiter, the first processing circuit in the third circuit set sends the packet header f31 to the second processing circuit in the third circuit set.

Based on the information about the consistency, the second arbiter determines that a type, a value, and a location in the packet header f11 that are of the MPLS header in the packet header f11 that needs to be processed by the second processing circuit in the first circuit set are the same as a type, a value, and a location in the packet header f21 that are of the MPLS header in the packet header f21 that needs to be processed by the second processing circuit in the second circuit set, and are also the same as a type, a value, and a location in the packet header f31 that are of the MPLS header in the packet header f31 that needs to be processed by the second processing circuit in the third circuit set. That is, the second processing circuit in the second circuit set and the second processing circuit in the third circuit set can share intermediate data obtained by the second processing circuit in the first circuit set based on the packet header f1t. Therefore, the second arbiter sends an operation indicator to the second processing circuit in the first circuit set, and the second arbiter sends an idle indicator to the second processing circuit in the second circuit set and the second processing circuit in the third circuit set.

After receiving the operation indicator from the second arbiter, the second processing circuit in the first circuit set obtains data $D'_{(1, 2)}$ based on an MPLS header in the packet header f11, and sends the packet header f11 and data $D_{(1, 2)}$ to the third processing circuit in the first circuit set, where the data $D_{(1, 2)}$ is obtained based the data $D_{(1, 1)}$ and the data $D'_{(1, 2)}$. After receiving the idle indicator from the second arbiter, the second processing circuit in the second circuit set sends the packet header f21 to the third processing circuit in the second circuit set. Similarly, after receiving the idle indicator from the second arbiter, the second processing circuit in the third circuit set sends the packet header f31 to the third processing circuit in the third circuit set.

Based on the information about the consistency, the third arbiter determines that a value of the IP header in the packet header f11 that needs to be processed by the third processing circuit in the first circuit set is different from a value of the IP header in the packet header f21 that needs to be processed by the third processing circuit in the second circuit set, and a type, a value, and a location in the packet header f21 that are of the IP header in the packet header f21 that needs to be processed by the third processing circuit in the second circuit set are the same as a type, a value, and a location in the packet header f31 that are of the IP header in the packet header f31 that needs to be processed by the third processing circuit in the third circuit set. That is, the third processing circuit in the second circuit set cannot share intermediate data obtained by the third processing circuit in the first circuit set based on the packet header f11, while the third processing circuit in the third circuit set can share intermediate data obtained by the third processing circuit in the second circuit set based on the packet f21. Therefore, the third arbiter sends an operation indicator to the third processing circuit in the first circuit set and the third processing circuit in the second circuit set, and the third arbiter sends an idle indicator to the third processing circuit in the third circuit set. The third arbiter further sends a data sharing indication to the third processing circuit in the first circuit set.

After receiving the data sharing indication from the third arbiter, the third processing circuit in the first circuit set sends the data $D_{(1, 2)}$ to the third processing circuit in the second circuit set.

After receiving the operation indicator from the third arbiter, the third processing circuit in the first circuit set obtains data $D'(1, 3)$ based on the IP header in the packet header f11, and sends the packet header f11 and data $D_{(1, 3)}$ to the fourth processing circuit in the first circuit set, where the data $D_{(1, 3)}$ is obtained based the data $D_{(1, 2)}$ and the data $D'_{(1, 3)}$. After receiving the operation indicator from the third arbiter, the third processing circuit in the second circuit set obtains data $D'_{(2, 3)}$ based on the IP header in the packet header f21, and sends the packet header f21 and data $D_{(2, 3)}$ to the fourth processing circuit in the second circuit set, where the data $D_{(2, 3)}$ is obtained based the data $D_{(1, 2)}$ and the data $D'(2, 3)$. After receiving the idle indicator from the third arbiter, the third processing circuit in the third circuit set sends the packet header f31 to the fourth processing circuit in the third circuit set.

In addition, if the data $D_{(1, 2)}$ includes an identifier of an instruction $I_{(1, 3)}$, the third arbiter may further send an instruction sharing indication to the third processing circuit in the first circuit set because both the third processing circuit in the second circuit set and the third processing circuit in the first circuit set have received the data $D_{(1, 2)}$. After receiving the instruction sharing indication from the third arbiter, the third processing circuit in the first circuit set sends, to the third processing circuit in the second circuit set, the instruction $I_{(1, 3)}$ obtained by the third processing circuit in the first circuit set based on the identifier of the instruction $I_{(1, 3)}$. The third processing circuit in the second circuit set may obtain the data $D'_{(2, 3)}$ based on the instruction $I_{(1, 3)}$ and the IP header in the packet header f21.

Based on the information about the consistency, the fourth arbiter determines that a value of the TCP header in the packet header f11 that needs to be processed by the fourth processing circuit in the first circuit set may be different from a value of the TCP header in the packet header f21 that needs to be processed by the fourth processing circuit in the second circuit set, and a type of the TCP header in the packet header f21 that needs to be processed by the fourth processing circuit in the second circuit set is different from a type of the UDP header in the packet header f31 that needs to be processed by the fourth processing circuit in the third circuit set. That is, the fourth processing circuit in the second circuit set cannot share intermediate data obtained by the fourth processing circuit in the first circuit set based on the packet header f11, and the fourth processing circuit in the third circuit set can share intermediate data obtained by the fourth processing circuit in the second circuit set based on the packet f21. Therefore, the fourth arbiter sends an operation indicator to the third processing circuit in the first circuit set, the third processing circuit in the second circuit set, and the fourth processing circuit in the second circuit set; the fourth arbiter further sends a data sharing indication to the third processing circuit in the second circuit set.

After receiving the data sharing indication from the fourth arbiter, the third processing circuit in the second circuit set sends the data $D_{(2, 3)}$ to the fourth processing circuit in the third circuit set.

After receiving the operation indicator from the fourth arbiter, the fourth processing circuit in the first circuit set obtains data $D'_{(1, 4)}$ based on the TCP header in the packet header f11, and sends the packet header f11 and data $D_{(1, 4)}$ to the fifth processing circuit in the first circuit set, where the data $D_{(1, 4)}$ is obtained based the data $D_{(1, 3)}$ and the data $D'_{(1, 4)}$. After receiving the operation indicator from the fourth arbiter, the fourth processing circuit in the second circuit set obtains data $D'_{(2, 4)}$ based on the TCP header in the packet header f21, and sends the packet header f21 and data $D_{(2, 4)}$ to the fifth processing circuit in the second circuit set, where the data $D_{(2, 4)}$ is obtained based the data $D_{(1, 3)}$ and the data $D'(2, 4)$. After receiving the operation indicator from the fourth arbiter, the fourth processing circuit in the third circuit set obtains data $D'_{(3, 4)}$ based on the UDP header in the packet header f31, and sends the packet header f31 and data $D_{(3, 4)}$ to the fifth processing circuit in the third circuit set, where the data $D_{(3, 4)}$ is obtained based the data $D_{(2, 3)}$ and the data $D'_{(3, 4)}$.

The following further provides a related apparatus configured to implement the foregoing solutions.

Figure 7:
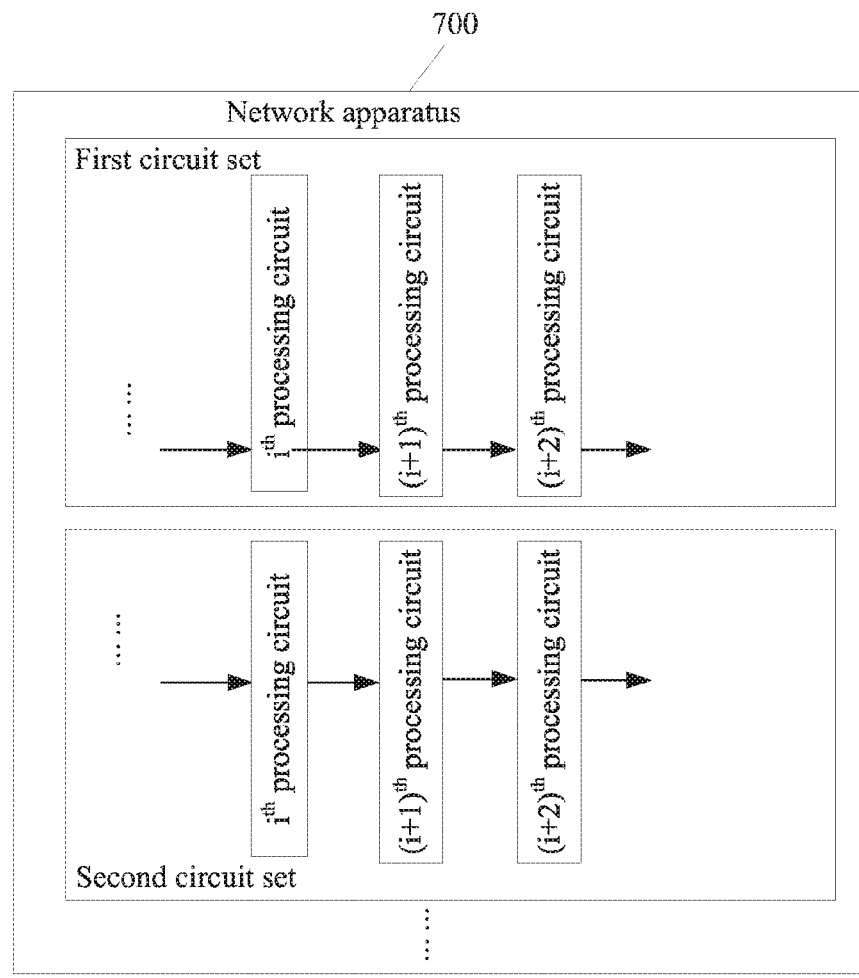
FIG. 7 is a schematic diagram of another network apparatus according to an embodiment.

Referring to FIG. 7, FIG. 7 shows a network apparatus 700, The network apparatus 700 includes a first circuit set and a second circuit set. The network apparatus 700 may be configured to implement the method shown in FIG. 2.

An $i^{th}$ processing circuit in the first circuit set is configured to receive a first packet header and data $D_{(1, i-1)}$, obtain data $D'_{(1, i)}$ based on a first field in the first packet header, and send the first packet header and data $D_{(1, i)}$ to an $(i+1)^{th}$ processing circuit in the first circuit set, where the data $D_{(1, i)}$ is obtained based on the data $D_{(1, i-1)}$ and the data $D'_{(1, i)}$.

The $i^{th}$ processing circuit in the first circuit set is further configured to send the data $D_{(1, i)}$ to the $(i+1)^{th}$ processing circuit in the second circuit set.

The $i^{th}$ processing circuit in the second circuit set is configured to send a second packet header to the $(i+1)^{th}$ processing circuit in the second circuit set, where a type and a value of a second field in the second packet header are the same as a type and a value of the first field in the first packet header, and a location of the second field in the second packet header is the same as a location of the first field in the first packet header.

The first packet header is a packet header of a first packet, where the first packet header may include only an outer header of the first packet, or the first packet header may include an outer header and at least one inner header of the first packet. For example, when the first packet is an IP packet, the first packet header may include an IP header, or the first packet header may include an IP header and a TCP header, or the first packet header may include an IP header and a UDP header. For another example, when the first packet is an Ethernet frame, the first packet header may include a MAC header; or the first packet header may include a MAC header and an IP header; or the first packet header may include a MAC header, an MPLS header, and an IP header; or the first packet header may include a MAC header, an MPLS header, an IP header, and a TCP header or a UDP header.

The second packet header is a packet header of a second packet, and similarly, the second packet header may include only an outer header of the second packet, or the second packet header may include an outer header and at least one inner header of the second packet. For example, when the second packet is an IP packet, the second packet header may include an IP header, or the second packet header may include an IP header and a TCP header, or the second packet header may include an IP header and a UDP header. For another example, when the second packet is an Ethernet frame, the second packet header may include a MAC header; or the second packet header may include a MAC header and an IP header; or the second packet header may include a MAC header, an MPLS header, and an IP header; or the second packet header may include a MAC header, an MPLS header, an IP header, and a TCP header; or the second packet header may include a MAC header, an MPLS header, an IP header, and a UDP header.

For example, i is a positive integer. It may be understood that the $i^{th}$ processing circuit in the first circuit set may be the first processing circuit, the second processing circuit, or the third processing circuit in the first circuit set; the $i^{th}$ processing circuit in the second circuit set may be the first processing circuit, the second processing circuit, or the third processing circuit in the second circuit set, where the first circuit set and the second circuit set may be any two circuit sets in the network apparatus.

The first circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

The second circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

The type and the value of the second field in the second packet header are the same as the type and the value of the first field in the first packet header, and the location of the second field in the second packet header is the same as the location of the first field in the first packet header.

For example, an offset of the second field in the second packet header relative to a start position of the second packet header is equal to an offset of the first field in the first packet header relative to a start position of the first packet header. Specifically, for example, an offset of a most significant bit (MSB) of the second field in the second packet header relative to the start position of the second packet header is 50 bytes, and an offset of an MSB of the first field in the first packet header relative to the start position of the first packet header is also 50 bytes. Alternatively, an offset of the second field in the second packet header relative to an end position of the second packet header is equal to an offset of the first field in the first packet header relative to an end position of the first packet header. For example, an offset of a MSB of the second field in the second packet header relative to the end position of the second packet header is 65 bytes, and an offset of an MSB of the first field in the first packet header relative to the end position of the first packet header is also 65 bytes.

For example, first data in the first packet is equal to second data in the second packet, where the first data is data from the MSB of the first packet header to an LSB of the first field; and the second data is data from the MSB of the second packet header to an LSB of the second field.

Optionally, in some possible implementation manners, the network apparatus further includes an arbiter, where: the arbiter is configured to send a data sharing indication to the $i^{th}$ processing circuit in the first circuit set when determining that a type and a value of a third field in the second packet header needs to be processed by that the $(i+1)^{th}$ processing circuit in the second circuit set are different from a type and a value of a fourth field in the first packet header that needs to be processed by the $(i+1)^{th}$ processing circuit in the first circuit set; or the arbiter is configured to send a data sharing indication to the $i^{th}$ processing circuit in the first circuit set when it is determined that a value of a third field in a second packet header that needs to be processed by the $(i+1)^{th}$ processing circuit in the second circuit set is different from a value of a fourth field in a first packet header that needs to be processed by the $(i+1)^{th}$ processing circuit in the first circuit; or the arbiter is configured to send a data sharing indication to the $i^{th}$ processing circuit in the first circuit set when determining that a type of a third field in the second packet header that needs to be processed by the $(i+1)^{th}$ processing circuit in the second circuit set is different from a type of a fourth field in the first packet header that needs to be processed by the $(i+1)^{th}$ processing circuit in the first circuit, and that a value of a third field in the second packet header that needs to be processed by the $(i+1)^{th}$ processing circuit in the second circuit set is different from a value of a fourth field in the first packet header that needs to be processed by the $(i+1)^{th}$ processing circuit in the first circuit; and the $i^{th}$ processing circuit in the first circuit set is configured to send the data $D_{(1, i)}$ to the $(i+1)^{th}$ processing circuit in the second circuit set in response to the data sharing indication.

Optionally, in some possible implementation manners, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$; the $(i+1)^{th}$ processing circuit in the first circuit set is further configured to send the instruction $I_{(1, i+1)}$ to the $(i+1)^{th}$ processing circuit in the second circuit set; the $(i+1)^{th}$ processing circuit in the first circuit set is further configured to obtain data $D'_{(1, i+1)}$ according to the instruction $I_{(1, i+1)}$ and the first packet header, and send data $D_{(1, i+1)}$ and the first packet header to an $(i+2)^{th}$ processing circuit in the first circuit set, where the data $D_{(1, +1)}$ is obtained based on the data $D_{(1, i)}$ and the data $D'_{(1, i+1)}$; and the $(i+1)^{th}$ processing circuit in the second circuit set is configured to obtain data $D'_{(2, i+1)}$ according to the instruction $I_{(1, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$.

Optionally, in some possible implementation manners, the $(i+2)^{th}$ processing circuit in the first circuit set is configured to obtain an instruction $I_{(1, i+2)}$ based on an identifier that is of the instruction $I_{(1, i+2)}$ and included in the data $D_{(1, i+1)}$, obtain data $D'_{(1, i+2)}$ according to the processing instruction $I_{(1, i+2)}$ and the first packet header, and send the first packet header and data $D_{(1, i+2)}$ to the $(i+3)^{th}$ processing circuit in the first circuit set, where the data $D_{(1, i+2)}$ is obtained based on the data $D_{(1, i+1)}$ and the data $D'_{(1, i+2)}$; and the $(i+2)^{th}$ processing circuit in the second circuit set is configured to obtain an instruction $I_{(2, i+2)}$ based on an identifier that is of the instruction $I_{(2, i+2)}$ and included in the data $D_{(2, i+1)}$, obtain data $D'_{(2, i+2)}$ according to the instruction $I_{(2, i+2)}$ and the second packet header, and send data $D_{(2, i+2)}$ and the second packet header to the $(i+3)^{th}$ processing circuit in the second circuit set, where the data $D_{(2, i+2)}$ is obtained based on the data $D_{(2, i+1)}$ and the data $D'_{(2, i+2)}$.

Optionally, in some possible implementation manners, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$, obtain data $D'_{(1, i+1)}$ according to the processing instruction $I_{(1, i+1)}$ and the first packet header, and send data $D_{(1, i+1)}$ and the first packet header to the $(i+2)^{th}$ processing circuit in the first circuit set, where the data $D_{(1, i+1)}$ is obtained based on the data $D_{(1, i)}$ and the data $D'_{(1, i+1)}$; and the $(i+1)^{th}$ processing circuit in the second circuit set is configured to obtain an instruction $I_{(2, i+1)}$ based on an identifier that is of the instruction $I_{(2, i+1)}$ and included in the data $D_{(2, i)}$, obtain data $D'_{(2, i+1)}$ according to the instruction $I_{(2, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(1, i)}$ and the data $D'_{(2, i+1)}$.

Optionally, in some possible implementation manners, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the $(i+1)^{th}$ table lookup unit in the $(i+1)^{th}$ processing circuit in the first circuit set is configured to obtain data $B_{(1, i+1)}$ by means of table lookup; the $(i+1)^{th}$ instruction executing unit in the $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header; and the $(i+1)^{th}$ table lookup unit in the $(i+1)^{th}$ processing circuit in the second circuit set is configured to obtain data $B_{(2, i+1)}$ by means of table lookup; the $(i+1)^{th}$ instruction executing unit in the $(i+1)^{th}$ processing circuit in the second circuit set is configured to obtain the data $D'_{(2, i+1)}$ according to the instruction $I_{(2, i+1)}$, the data $B_{(2, i+1)}$, and the second packet header.

Optionally, in some possible implementation manners, the network apparatus further includes an aggregator and a table lookup engine; the $(i+1)^{th}$ table lookup unit in the $(i+1)^{th}$ processing circuit in the first circuit set is configured to send a table lookup request $Q_{(1, i+1)}$ to the aggregator, and receive the data $B_{(1, i+1)}$ fed back by the aggregator; the $(i+1)^{th}$ table lookup unit in the $(i+1)^{th}$ processing circuit in the second circuit set is configured to send a table lookup request $Q_{(2, i+1)}$ to the aggregator, and receive the data $B_{(2, i+1)}$ fed back by the aggregator; and the aggregator is configured to: after receiving the table lookup request $Q_{(2, i+1)}$ and the table lookup request $Q_{(1, i+1)}$, send the table lookup request $Q_{(2, i+1)}$ or the table lookup request $Q_{(1, i+1)}$ to the table lookup engine, receive the data $B_{(2, i+1)}$ sent by the table lookup engine in response to the table lookup request $Q_{(2, i+1)}$ or the table lookup request $Q_{(1, i+1)}$, feed back the data $B_{(1, i+1)}$ to the $(i+1)^{th}$ table lookup unit in the $(i+1)^{th}$ processing circuit in the first circuit set, and feed back the data $B_{(2, i+1)}$ to the $(i+1)^{th}$ table lookup unit in the $(i+1)^{th}$ processing circuit in the second circuit set, where the data $B_{(2, i+1)}$ is the same as the data $B_{(1, i+1)}$, and the table lookup request $Q_{(2, i+1)}$ and the table lookup request $Q_{(1, i+1)}$ include a same table search key value.

It may be understood that functions of each function module in the network apparatus 700 in this embodiment may be specifically implemented according to a method in the foregoing method embodiments. For a specific implementation process, refer to related descriptions of the foregoing method embodiments, and details are not described herein again. For example, the network apparatus 700 may be a router, a network switch, or the like.

It can be learned that, in this embodiment, a type and a value of a second field in a second packet header are the same as a type and a value of a first field in a first packet header, and a location of the second field in the second packet header is the same as a location of the first field in the first packet header. Therefore, if the first field and the second field are processed in a same processing manner, a processing result corresponding to the first field is the same as a processing result corresponding to the second field. The $i^{th}$ processing circuit in a first circuit set receives a first packet header and data $D_{(1, i-1)}$, obtains data $D'_{(1, i)}$ based on the first field in the first packet header, and sends the first packet header and data $D_{(1, i)}$ to the $(i+1)^{th}$ processing circuit in the first circuit set. The $i^{th}$ processing circuit in a second circuit set does not need to process the second field in the second packet header in a processing manner the same as a processing manner in which the $i^{th}$ processing circuit in the first circuit set processes the first field in the first packet header. The $(i+1)^{th}$ processing circuit in the second circuit set obtains the data $D_{(1, i)}$ by receiving the data $D_{(1, i)}$ sent by the $i^{th}$ processing circuit in the first circuit set, that is, by using a processing result sharing mechanism between the foregoing circuit sets, the second circuit set can obtain a processing result provided by the first circuit set. Therefore, the $i^{th}$ processing circuit in the second circuit set may be in an idle state (the second field in the second packet header does not need to be processed) under a specific condition. Therefore, the foregoing technical solutions can help to reduce power consumption, save resources, and improve packet processing efficiency.

Figure 8:
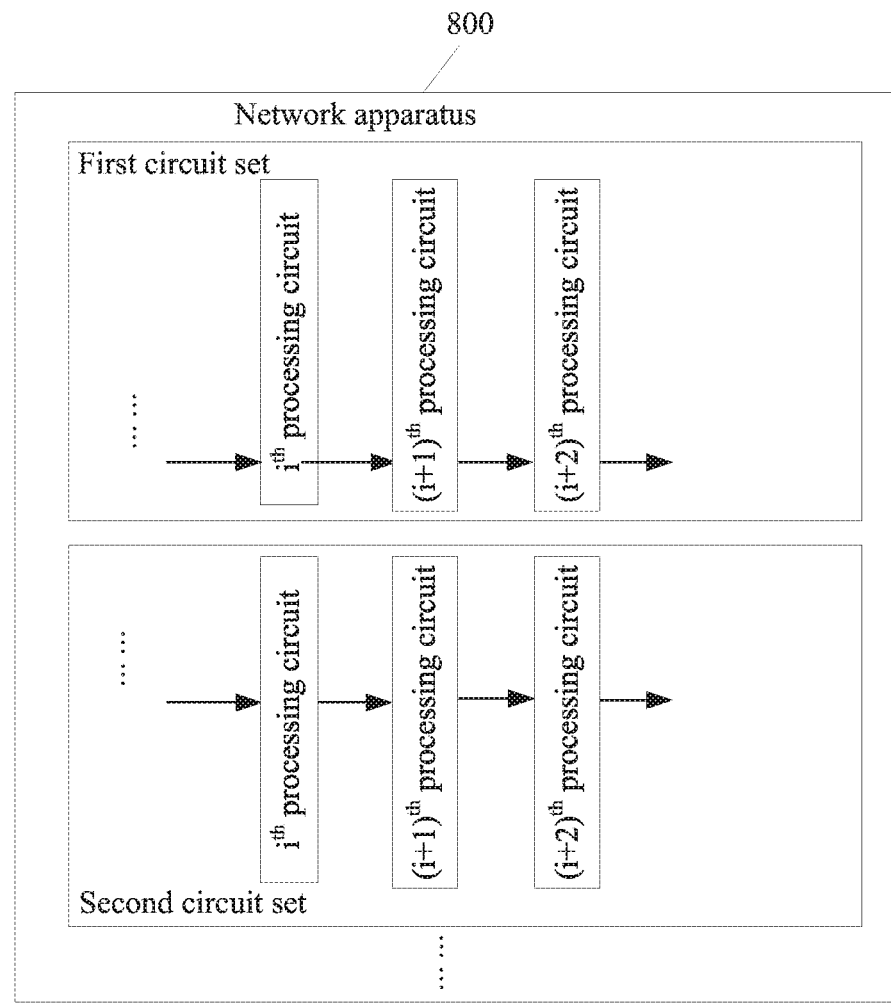
FIG. 8 is a schematic diagram of another network apparatus according to an embodiment.

Referring to FIG. 8, an embodiment provides another network apparatus 800. The network apparatus 800 may be configured to implement the method shown in FIG. 4.

The network apparatus 800 may include a first circuit set and a second circuit set. An $i^{th}$ processing circuit in the first circuit set is configured to receive a first packet header and data $D_{(1, i-1)}$, obtain an instruction $I_{(1, i)}$ based on an identifier that is of the instruction $I_{(1, i)}$ and included in the data $D_{(1, i-1)}$, and send the instruction $I_{(1, i)}$ to the $i^{th}$ processing circuit in the second circuit set.

The $i^{th}$ processing circuit in the first circuit set is further configured to obtain data $D'_{(1, i)}$ according to the instruction $I_{(1, i)}$ and the first packet header.

The $i^{th}$ processing circuit in the first circuit set is further configured to send data $D_{(1, i)}$ and the first packet header to an $(i+1)^{th}$ processing circuit in the first circuit set, where the data $D_{(1, i)}$ is obtained based on the data $D_{(1, i-1)}$ and the data $D'_{(1, i)}$.

The $i^{th}$ processing circuit in the second circuit set is configured to receive a second packet header and data $D_{(2, i-1)}$, obtain data $D'_{(2, i)}$ according to the instruction $I_{(1, i)}$ and the second packet header, and send data $D_{(2, i)}$ and the second packet header to the $(i+1)^{th}$ processing circuit in the second circuit set, where the data $D_{(2, i)}$ is obtained based on the data $D'_{(2, i)}$ and the data $D_{(2, i-1)}$.

The first packet header is a packet header of a first packet, where the first packet header may include only an outer header of the first packet, or the first packet header may include an outer header and at least one inner header of the first packet. For example, when the first packet is an IP packet, the first packet header may include an IP header, or the first packet header may include an IP header and a TCP header, or the first packet header may include an IP header and a UDP header. For another example, when the first packet is an Ethernet frame, the first packet header may include a MAC header; or the first packet header may include a MAC header and an IP header; or the first packet header may include a MAC header, an MPLS header, and an IP header; or the first packet header may include a MAC header, an MPLS header, an IP header, and a TCP header or a UDP header.

The second packet header is a packet header of a second packet, and similarly, the second packet header may include only an outer header of the second packet, or the second packet header may include an outer header and at least one inner header of the second packet. For example, when the second packet is an IP packet, the second packet header may include an IP header, or the second packet header may include an IP header and a TCP header, or the second packet header may include an IP header and a UDP header. For another example, when the second packet is an Ethernet frame, the second packet header may include a MAC header; or the second packet header may include a MAC header and an IP header; or the second packet header may include a MAC header, an MPLS header, and an IP header; or the second packet header may include a MAC header, an MPLS header, an IP header, and a TCP header; or the second packet header may include a MAC header, an MPLS header, an IP header, and a UDP header.

For example, i is a positive integer. It may be understood that the $i^{th}$ processing circuit in the first circuit set may be the first processing circuit, the second processing circuit, or the third processing circuit in the first circuit set; the $i^{th}$ processing circuit in the second circuit set may be the first processing circuit, the second processing circuit, or the third processing circuit in the second circuit set, where the first circuit set and the second circuit set may be any two circuit sets in the network apparatus.

The first circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

The second circuit set includes the first processing circuit to the $(i+1)^{th}$ processing circuit, where the first processing circuit is a start processing circuit in the first circuit set. In a scenario in which a current processing circuit is an intermediate processing circuit in the first circuit set, the current processing circuit can receive data sent by a previous processing circuit, and the current processing circuit can send data to a next processing circuit. For example, if the current processing circuit is the second processing circuit, the second processing circuit can receive data sent by the first processing circuit, and the second processing circuit can send data to the third processing circuit.

A type and a value of the second field in the second packet header are the same as a type and a value of the first field in the first packet header, and a location of the second field in the second packet header is the same as a location of the first field in the first packet header.

For example, an offset of the second field in the second packet header relative to a start position of the second packet header is equal to an offset of the first field in the first packet header relative to a start position of the first packet header. Specifically, for example, an offset of an MSB of the second field in the second packet header relative to the start position of the second packet header is 50 bytes, and an offset of an MSB of the first field in the first packet header relative to the start position of the first packet header is also 50 bytes. Alternatively, an offset of the second field in the second packet header relative to an end position of the second packet header is equal to an offset of the first field in the first packet header relative to an end position of the first packet header. For example, an offset of a MSB of the second field in the second packet header relative to the end position of the second packet header is 65 bytes, and an offset of an MSB of the first field in the first packet header relative to the end position of the first packet header is also 65 bytes.

For example, first data in the first packet is equal to second data in the second packet, where the first data is data from the MSB of the first packet header to an LSB of the first field; and the second data is data from the MSB of the second packet header to an LSB of the second field.

Optionally, in some possible implementation manners, the $(i+1)^{th}$ processing circuit in the first circuit set is configured to obtain an instruction $I_{(1, i+1)}$ based on an identifier that is of the instruction $I_{(1, i+1)}$ and included in the data $D_{(1, i)}$, obtain data $D'_{(1, i+1)}$ according to the processing instruction $I_{(1, i+1)}$ and the first packet header, and send data $D_{(1, i+1)}$ and the first packet header to an $(i+2)^{th}$ processing circuit in the first circuit set, where the data $D_{(1, i+1)}$ is obtained based on the data $D_{(1, i)}$ and the data $D'_{(1, i+1)}$; and the $(i+1)^{th}$ processing circuit in the second circuit set is configured to obtain an instruction $I_{(2, i+1)}$ based on an identifier that is of the instruction $I_{(2, i+1)}$ and included in the data $D_{(2, i)}$, obtain data $D'_{(2, i+1)}$ according to the instruction $I_{(2, i+1)}$ and the second packet header, and send data $D_{(2, i+1)}$ and the second packet header to the $(i+2)^{th}$ processing circuit in the second circuit set, where the data $D_{(2, i+1)}$ is obtained based on the data $D_{(2, i)}$ and the data $D'_{(2, i+1)}$.

Optionally, in some possible implementation manners, the $(i+1)^{th}$ processing circuit in the first circuit set includes an $(i+1)^{th}$ table lookup unit and an $(i+1)^{th}$ instruction executing unit, and the $(i+1)^{th}$ processing circuit in the second circuit set includes an $(i+1)^{th}$ table lookup unit and an $(i+1)^{th}$ instruction executing unit; the $(i+1)^{th}$ table lookup unit in the $(i+1)^{th}$ processing circuit in the first circuit set is configured to obtain data $B_{(1, i+1)}$ by means of table lookup; the $(i+1)^{th}$ instruction executing unit in the $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header; and the $(i+1)^{th}$ table lookup unit in the $(i+1)^{th}$ processing circuit in the second circuit set is configured to obtain data $B_{(2, i+1)}$ by means of table lookup; the $(i+1)^{th}$ instruction executing unit in the $(i+1)^{th}$ processing circuit in the second circuit set is configured to obtain the data $D'_{(2, i+1)}$ according to the instruction $I_{(2, i+1)}$, the data $B_{(2, i+1)}$, and the second packet header.

Optionally, in some possible implementation manners, the network apparatus further includes an aggregator and a table lookup engine; the $(i+1)^{th}$ table lookup unit in the $(i+1)^{th}$ processing circuit in the first circuit set is configured to send a table lookup request $Q_{(1, i+1)}$ to the aggregator, and receive the data $B_{(1, i+1)}$ fed back by the aggregator; the $(i+1)^{th}$ table lookup unit in the $(i+1)^{th}$ processing circuit in the second circuit set is configured to send a table lookup request $Q_{(2, i+1)}$ to the aggregator, and receive the data $B_{(2, i+1)}$ fed back by the aggregator; and the aggregator is configured to; after receiving the table lookup request $Q_{(2, i+1)}$ and the table lookup request $Q_{(1, i+1)}$, send the table lookup request $Q_{(2, i+1)}$ or the table lookup request $Q_{(1, i+1)}$ to the table lookup engine, receive the data $B_{(2, i+1)}$ sent by the table lookup engine in response to the table lookup request $Q_{(2, i+1)}$ or the table lookup request $Q_{(1, i+1)}$, where the table lookup request $Q_{(2, i+1)}$ and the table lookup request $Q_{(1, i+1)}$ include a same table search key value, and the data $B_{(1, i+1)}$ is the same as the data $B_{(2, i+1)}$.

Optionally, in some possible implementation manners, the network apparatus further includes an arbiter, where: the arbiter is configured to send an instruction sharing indication to the $i^{th}$ processing circuit in the first circuit set when it is determined that the identifier that is of the instruction $I_{(1, i)}$ and included in the data $D_{(1, i-1)}$ is the same as an identifier that is of an instruction $I_{(2, i)}$ and included in the data $D_{(2, i-1)}$; and the $i^{th}$ processing circuit in the second circuit set is configured to send the instruction $I_{(1, i)}$ to the $i^{th}$ processing circuit in the second circuit set in response to the instruction sharing indication.

It may be understood that functions of each function module in the network apparatus 800 in this embodiment may be specifically implemented according to the methods in the foregoing method embodiments. For a specific implementation process, refer to related descriptions of the foregoing method embodiments, and details are not described herein again. For example, the network apparatus 800 may be a router, a network switch, or the like.

It can be learned that, in this embodiment, the $i^{th}$ processing circuit in a first circuit set shares an instruction $I_{(1, i)}$ with the $i^{th}$ processing circuit in a second circuit set, so that the $i^{th}$ processing circuit in the second circuit set may obtain data $D'_{(2, i)}$ according to the instruction $I_{(1, i)}$ and a received second packet header. An instruction sharing mechanism between circuit sets is introduced, so that some of processing circuits in some circuit sets in the network apparatus may be exempted from reading an instruction from instruction memories of the processing circuits. This helps to reduce usage of the instruction memories, and reduce occupation of instruction fetch bandwidth; this also helps to increase a resource utilization rate and reduce packet forwarding processing complexity.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that the present embodiments are not limited to the described order of the actions, because according to the present embodiments, some steps may be performed in other orders or simultaneously. In addition, a person skilled in the art should also understand that all the embodiments described in this specification belong to example embodiments, and the involved actions and modules are not necessarily mandatory to the present embodiments.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or some of the technical solutions may be implemented in the form of a software product. The software product is stored in a storage medium and includes several instructions for instructing a computer device (which may be a personal computer, a server, or a network device, and may specifically be a processor in a computer device) to perform all or some of the steps of the foregoing methods described in the embodiments. The foregoing storage medium may include: any medium that can store program code, such as a universal serial bus (USB) flash drive, a removable hard disk, a magnetic disk, an optical disc, a read-only memory (ROM), or a random access memory (RAM).

The foregoing embodiments are merely intended for describing the technical solutions of the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method comprising:
receiving a first packet header and data $D_{(1, i-1)}$ a first $i^{th}$ processing circuit in a first circuit set of a network apparatus;
obtaining, by the first $i^{th}$ processing circuit in the first circuit set, data $D'_{(1, i)}$ based on a first field in the first packet header that is received;
sending, by the first $i^{th}$ processing circuit in the first circuit set, the first packet header and data $D_{(1, i)}$ to a first $(i+1)^{th}$ processing circuit in the first circuit set, wherein the data $D_{(1, i)}$ is obtained based on the data $D_{(1, i-1)}$ and the data $D'_{(1, i)}$;
sending, by the first $i^{th}$ processing circuit in the first circuit set, the data $D_{(1, i)}$ to a second $(i+1)^{th}$ processing circuit in a second circuit set of the network apparatus; and
sending, by a second $i^{th}$ processing circuit in the second circuit set, a second packet header to the second $(i+1)^{th}$ processing circuit in the second circuit set;
wherein a type and a value of a second field in the second packet header are the same as a type and a value of the first field in the first packet header; and
wherein:
an offset of the second field in the second packet header relative to a start position of the second packet header is the same as an offset of the first field in the first packet header relative to a start position of the first packet header; or
an offset of the second field in the second packet header relative to an end position of the second packet header is the same as an offset of the first field in the first packet header relative to an end position of the first packet header.

2. The method according to claim 1, wherein the method further comprises:
obtaining, by the first $(i+1)^{th}$ processing circuit in the first circuit set, an instruction $I_{(1, i+1)}$ based on an identifier of the instruction $I_{(1, i+1)}$, wherein the identifier of the instruction $ID_{(1, i+1)}$ is included in the data $D_{(1, i)}$;
sending, by the first $(i+1)^{th}$ processing circuit in the first circuit set, the instruction $I_{(1, i+1)}$ to the second $(i+1)^{th}$ processing circuit in the second circuit set;
obtaining, by the first $(i+1)^{th}$ processing circuit in the first circuit set, data $D'_{(1, i+1)}$ according to the instruction $I_{(1, i+1)}$ and the first packet header;
sending data $D_{(1, i+1)}$ and the first packet header to a first $(i+2)^{th}$ processing circuit in the first circuit set, wherein the data $D_{(1, i+1)}$ is obtained based on the data $D_{(1, i)}$ and the data $D'_{(1, i+1)}$;
obtaining, by the second $(i+1)^{th}$ processing circuit in the second circuit set, data $D'_{(2, i+1)}$ according to the instruction $I_{(1, i+1)}$ and the second packet header; and
sending data $D_{(2, i+1)}$ and the second packet header to a second $(i+2)^{th}$ processing circuit in the second circuit set, wherein the data $D_{(2, i+1)}$ is obtained based on the data $D_{(1, i)}$ and the data $D'_{(2, i+1)}$.

3. The method according to claim 2, wherein the method further comprises:
  obtaining, by the first $(i+2)^{th}$ processing circuit in the first circuit set, an instruction $I_{(1, i+2)}$ based on an identifier of the instruction $I_{(1, i+2)}$, wherein the identifier of the instruction $I_{(1, i+2)}$ is included in the data $D_{(1, i+1)}$;
  obtaining data $D'_{(1, i+2)}$ according to the instruction $I_{(1, i+2)}$ and the first packet header;
  sending the first packet header and data $D_{(1, i+2)}$ to a first $(i+3)^{th}$ processing circuit in the first circuit set, wherein the data $D_{(1, i+2)}$ is obtained based on the data $D_{(1, i+1)}$ and the data $D'_{(1, i+2)}$;
  obtaining, by the second $(i+2)^{th}$ processing circuit in the second circuit set, an instruction $I_{(2, i+2)}$ based on an identifier of the instruction $I_{(2, i+2)}$, wherein the identifier of the instruction $I_{(2, i+2)}$ is included in the data $D_{(2, i+1)}$;
  obtaining data $D'_{(2, i+2)}$ according to the instruction $I_{(2, i+2)}$ and the second packet header; and
  sending data $D_{(2, i+2)}$ and the second packet header to a second $(i+3)^{th}$ processing circuit in the second circuit set, wherein the data $D_{(2, i+2)}$ is obtained based on the data $D_{(2, i+1)}$ and the data $D'_{(2, i+2)}$.

4. The method according to claim 1, wherein the method further comprises:
  obtaining, by the first $(i+1)^{th}$ processing circuit in the first circuit set, an instruction $I_{(1, i+1)}$ based on an identifier of the instruction $I_{(1, i+1)}$, wherein the identifier of the instruction $I_{(1, i+1)}$ is included in the data $D_{(1, i)}$;
  obtaining data $D'_{(1, i+1)}$ according to the instruction $I_{(1, i+1)}$ and the first packet header, and sending data $D_{(1, i+1)}$ and the first packet header to the first $(i+2)^{th}$ processing circuit in the first circuit set, wherein the data $D_{(1, i+1)}$ is obtained based on the data $D_{(1, i)}$ and the data $D'_{(1, i+1)}$;
  obtaining, by the second $(i+1)^{th}$ processing circuit in the second circuit set, an instruction $I_{(2, i+1)}$ based on an identifier of the instruction $I_{(2, i+1)}$, wherein the identifier of the instruction $I_{(2, i+1)}$ is included in the data $D_{(1, i)}$;
  obtaining data $D'_{(2, i+1)}$ according to the instruction $I_{(2, i+1)}$ and the second packet header; and
  sending data $D_{(2, i+1)}$ and the second packet header to the second $(i+2)^{th}$ processing circuit in the second circuit set, wherein the data $D_{(2, i+1)}$ is obtained based on the data $D_{(1, i)}$ and the data $D'_{(2, i+1)}$.

5. The method according to claim 4, wherein the first $(i+1)^{th}$ processing circuit in the first circuit set comprises an $(i+1)^{th}$ table lookup unit and an $(i+1)^{th}$ instruction executing unit, and the second $(i+1)^{th}$ processing circuit in the second circuit set comprises an $(i+1)^{th}$ table lookup unit and an $(i+1)^{th}$ instruction executing unit;
  wherein obtaining, by the first $(i+1)^{th}$ processing circuit in the first circuit set, data $D'_{(1, i+1)}$ according to the instruction $I_{(1, i+1)}$ and the first packet header comprises:
    obtaining, by the $(i+1)^{th}$ table lookup unit in the first $(i+1)^{th}$ processing circuit in the first circuit set, data $B_{(1, i+1)}$ by table lookup; and
    obtaining, by the $(i+1)^{th}$ instruction executing unit in the first $(i+1)^{th}$ processing circuit in the first circuit set, the data $D'_{(1, i+1)}$ according to the instruction $I_{(1, i+1)}$, the data $B_{(1, i+1)}$, and the first packet header; and
  wherein obtaining, by the second $(i+1)^{th}$ processing circuit in the second circuit set, data $D'_{(2, i+1)}$ according to the instruction $I_{(2, i+1)}$ and the second packet header comprises:
    obtaining, by the $(i+1)^{th}$ table lookup unit in the second $(i+1)^{th}$ processing circuit in the second circuit set, data $B_{(2, i+1)}$ by table lookup; and
    obtaining, by the $(i+1)^{th}$ instruction executing unit in the second $(i+1)^{th}$ processing circuit in the second circuit set, the data $D'_{(2, i+1)}$ according to the instruction $I_{(2, i+1)}$, the data $B_{(2, i+1)}$, and the second packet header.

6. The method according to claim 5, wherein the network apparatus further comprises an aggregator and a table lookup engine;
  wherein obtaining, by the $(i+1)^{th}$ table lookup unit in the first $(i+1)^{th}$ processing circuit in the first circuit set, data $B_{(1, i+1)}$ by table lookup comprises:
    sending, by the $(i+1)^{th}$ table lookup unit in the first $(i+1)^{th}$ processing circuit in the first circuit set, a table lookup request $Q_{(1, i+1)}$ to the aggregator; and
    receiving the data $B_{(1, i+1)}$ fed back by the aggregator;
  wherein obtaining, by the $(i+1)^{th}$ table lookup unit in the second $(i+1)^{th}$ processing circuit in the second circuit set, data $B_{(2, i+1)}$ by table lookup comprises:
    sending, by the $(i+1)^{th}$ table lookup unit in the second $(i+1)^{th}$ processing circuit in the second circuit set, a table lookup request $Q_{(2, i+1)}$ to the aggregator; and
    receiving, by the $(i+1)^{th}$ table lookup unit in the second $(i+1)^{th}$ processing circuit in the second circuit set, the data $B_{(2, i+1)}$ fed back by the aggregator; and
  wherein the method further comprises:
    sending, by the aggregator, the table lookup request $Q_{(2, i+1)}$ or the table lookup request $Q_{(1, i+1)}$ to the table lookup engine, after receiving the table lookup request $Q_{(2, i+1)}$ and the table lookup request $Q_{(1, i+1)}$;
    receiving the data $B_{(2, i+1)}$ sent by the table lookup engine in response to the table lookup request $Q_{(2, i+1)}$ or the table lookup request $Q_{(1, i+1)}$;
    feeding back the data $B_{(1, i+1)}$ to the $(i+1)^{th}$ table lookup unit in the first $(i+1)^{th}$ processing circuit in the first circuit set; and
    feeding back the data $B_{(2, i+1)}$ to the $(i+1)^{th}$ table lookup unit in the second $(i+1)^{th}$ processing circuit in the second circuit set, wherein the data $B_{(2, i+1)}$ is the same as the data $B_{(1, i+1)}$, and wherein the table lookup request $Q_{(2, i+1)}$ and the table lookup request $Q_{(1, i+1)}$ comprise a same table search key value.

7. The method according to claim 1, wherein the network apparatus further comprises an arbiter, and wherein the method further comprises:
  sending, by the arbiter, a data sharing indication to the first $i^{th}$ processing circuit in the first circuit set in response to determining that a type or a value of a third field in the second packet header to be processed by the second $(i+1)^{th}$ processing circuit in the second circuit set is different from a type or a value of a fourth field in the first packet header to be processed by the first $(i+1)^{th}$ processing circuit in the first circuit set; and
  wherein sending, by the first $i^{th}$ processing circuit in the first circuit set, the data $D_{(1, i)}$ to the second $(i+1)^{th}$ processing circuit in the second circuit set comprises sending, by the first $i^{th}$ processing circuit in the first circuit set, the data $D_{(1, i)}$ to the second $(i+1)^{th}$ processing circuit in the second circuit set in response to the data sharing indication.

8. A method comprising:
  receiving a first packet header and data $D_{(1,\ i-1)}$ by a first $i^{th}$ processing circuit in a first circuit set of a network apparatus;
  obtaining an instruction $I_{(1,\ i)}$ based on an identifier of the instruction $I_{(1,\ i)}$, wherein the identifier of the instruction $I_{(1,\ i)}$ is included in the data $D_{(1,\ i-1)}$;
  sending the instruction $I_{(1,\ i)}$ to a second $i^{th}$ processing circuit in a second circuit set of the network apparatus;
  obtaining, by the first $i^{th}$ processing circuit in the first circuit set, data $D'_{(1,\ i)}$ according to the instruction $I_{(1,\ i)}$ and the first packet header;
  sending, by the first $i^{th}$ processing circuit in the first circuit set, data $D_{(1,\ i)}$ and the first packet header to a first $(i+1)^{th}$ processing circuit in the first circuit set, wherein the data $D_{(1,\ i)}$ is obtained based on the data $D_{(1,\ i-1)}$ and the data $D'_{(1,\ i)}$;
  receiving, by a second $i^{th}$ processing circuit in the second circuit set, a second packet header and data $D_{(2,\ i-1)}$;
  obtaining data $D'_{(2,\ i)}$ according to the instruction $I_{(1,\ i)}$ and the second packet header; and
  sending data $D_{(2,\ i)}$ and the second packet header to a second $(i+1)^{th}$ processing circuit in the second circuit set, wherein the data $D_{(2,\ i)}$ is obtained based on the data $D'_{(2,\ i)}$ and the data $D_{(2,\ i-1)}$.

9. The method according to claim 8, wherein the method further comprises:
  obtaining, by the first $(i+1)^{th}$ processing circuit in the first circuit set, an instruction $I_{(1,\ i+1)}$ based on an identifier of the instruction $I_{(1,\ i+1)}$ wherein the identifier of the instruction $I_{(1,\ i+1)}$ is included in the data $D_{(1,\ i)}$;
  obtaining data $D'_{(1,\ i+1)}$ according to the instruction $I_{(1,\ i+1)}$ and the first packet header;
  sending data $D_{(1,\ i+1)}$ and the first packet header to a first $(i+2)^{th}$ processing circuit in the first circuit set, wherein the data $D_{(1,\ i+1)}$ is obtained based on the data $D_{(1,\ i)}$ and the data $D'_{(1,\ i+1)}$;
  obtaining, by the second $(i+1)^{th}$ processing circuit in the second circuit set, an instruction $I_{(2,\ i+1)}$ based on an identifier of the instruction $I_{(2,\ i+1)}$, wherein the identifier of the instruction $I_{(2,\ i+1)}$ is included in the data $D_{(2,\ i+1)}$;
  obtaining data $D'_{(2,\ i+1)}$ according to the instruction $I_{(2,\ i+1)}$ and the second packet header; and
  sending data $D_{(2,\ i+1)}$ and the second packet header to the second $(i+2)^{th}$ processing circuit in the second circuit set, wherein the data $D_{(2,\ i+1)}$ is obtained based on the data $D_{(2,\ i)}$ and the data $D'_{(2,\ i+1)}$.

10. The method according to claim 9, wherein the first $(i+1)^{th}$ processing circuit in the first circuit set comprises an $(i+1)^{th}$ table lookup unit and an $(i+1)^{th}$ instruction executing unit;
  wherein the second $(i+1)^{th}$ processing circuit in the second circuit set comprises an $(i+1)^{th}$ table lookup unit and an $(i+1)^{th}$ instruction executing unit;
  wherein obtaining, by the first $(i+1)^{th}$ processing circuit in the first circuit set, data $D'_{(1,\ i+1)}$ according to the instruction $I_{(1,\ i+1)}$ and the first packet header comprises:
    obtaining, by the $(i+1)^{th}$ table lookup unit in the first $(i+1)^{th}$ processing circuit in the first circuit set, data $B_{(1,\ i+1)}$ by table lookup; and
    obtaining, by the $(i+1)^{th}$ instruction executing unit in the first $(i+1)^{th}$ processing circuit in the first circuit set, the data $D'_{(1,\ i+1)}$ according to the instruction $I_{(1,\ i+1)}$, the data $B_{(1,\ i+1)}$, and the first packet header; and
  wherein obtaining, by the second $(i+1)^{th}$ processing circuit in the second circuit set, data $D'_{(2,\ i+1)}$ according to the instruction $I_{(2,\ i+1)}$ and the second packet header comprises:
    obtaining, by the $(i+1)^{th}$ table lookup unit in the second $(i+1)^{th}$ processing circuit in the second circuit set, data $B_{(2,\ i+1)}$ by table lookup; and
    obtaining, by the $(i+1)^{th}$ instruction executing unit in the second $(i+1)^{th}$ processing circuit in the second circuit set, the data $D'_{(2,\ i+1)}$ according to the instruction $I_{(2,\ i+1)}$, the data $B_{(2,\ i+1)}$, and the second packet header.

11. The method according to claim 10, wherein the network apparatus further comprises an aggregator and a table lookup engine;
  wherein obtaining, by the $(i+1)^{th}$ table lookup unit in the first $(i+1)^{th}$ processing circuit in the first circuit set, data $B_{(1,\ i+1)}$ by table lookup comprises:
    sending, by the $(i+1)^{th}$ table lookup unit in the first $(i+1)^{th}$ processing circuit in the first circuit set, a table lookup request $Q_{(1,\ i+1)}$ to the aggregator; and
    receiving the data $B_{(1,\ i+1)}$ fed back by the aggregator;
  wherein obtaining, by the $(i+1)^{th}$ table lookup unit in the second $(i+1)^{th}$ processing circuit in the second circuit set, data $B_{(2,\ i+1)}$ by table lookup comprises:
    sending, by the $(i+1)^{th}$ table lookup unit in the second $(i+1)^{th}$ processing circuit in the second circuit set, a table lookup request $Q_{(2,\ i+1)}$ to the aggregator; and
    receiving the data $B_{(2,\ i+1)}$ fed back by the aggregator; and
  wherein the method further comprises:
    sending, by the aggregator, the table lookup request $Q_{(2,\ i+1)}$ or the table lookup request $Q_{(1,\ i+1)}$ to the table lookup engine, after receiving the table lookup request $Q_{(2,\ i+1)}$ and the table lookup request $Q_{(1,\ i+1)}$; and
    receiving the data $B_{(2,\ i+1)}$ sent by the table lookup engine in response to the table lookup request $Q_{(2,\ i+1)}$ or the table lookup request $Q_{(1,\ i+1)}$, wherein the table lookup request $Q_{(2,\ i+1)}$ and the table lookup request $Q_{(1,\ i+1)}$ comprise a same table search key value, and wherein the data $B_{(1,\ i+1)}$ is the same as the data $B_{(2,\ i+1)}$.

12. The method according to claim 8, wherein the network apparatus further comprises an arbiter, and wherein the method further comprises:
  sending, by the arbiter, an instruction sharing indication to the first $i^{th}$ processing circuit in the first circuit set in response to it being determined that the identifier of the instruction $I_{(1,\ i)}$, wherein the identifier of the instruction $I_{(1,\ i)}$ is included in the data $D_{(1,\ i-1)}$ is the same as an identifier of an instruction $I_{(2,\ i)}$, wherein the identifier of the instruction $I_{(2,\ i)}$ is included in the data $D_{(2,\ i-1)}$; and
  wherein sending the instruction $I_{(1,\ i)}$ to the second $i^{th}$ processing circuit in the second circuit set comprises sending, by the first $i^{th}$ processing circuit in the first circuit set, the instruction $I_{(1,\ i)}$ to the second $i^{th}$ processing circuit in the second circuit set in response to the instruction sharing indication.

13. A network apparatus comprising a first circuit set and a second circuit set;
  wherein the first circuit set comprises a first $i^{th}$ processing circuit and a first $(i+1)^{th}$ processing circuit;
  wherein the second circuit set comprises a second $i^{th}$ processing circuit and a second $(i+1)^{th}$ processing circuit;

wherein the first $i^{th}$ processing circuit of the first circuit set is configured to:
  receive a first packet header and data $D_{(1, i-1)}$;
  obtain data $D'_{(1, i)}$ based on a first field in the first packet header that is received;
  send the first packet header and data $D_{(1, i)}$ to the first $(i+1)^{th}$ processing circuit in the first circuit set, wherein the data $D_{(1, i)}$ is obtained based on the data $D_{(1, i-1)}$ and the data $D'_{(1, i)}$; and
  send the data $D_{(1, i)}$ to the second $(i+1)^{th}$ processing circuit in the second circuit set;
wherein the second $i^{th}$ processing circuit of the second circuit set is configured to send a second packet header to the second $(i+1)^{th}$ processing circuit in the second circuit set;
wherein a type and a value of a second field in the second packet header are the same as a type and a value of the first field in the first packet header; and
wherein:
  an offset of the second field in the second packet header relative to a start position of the second packet header is the same as an offset of the first field in the first packet header relative to a start position of the first packet header; or
  an offset of the second field in the second packet header relative to an end position of the second packet header is the same as an offset of the first field in the first packet header relative to an end position of the first packet header.

14. The network apparatus according to claim 13, wherein the first $(i+1)^{th}$ processing circuit in the first circuit set is configured to obtain an instruction $I_{(1, i+1)}$ based on an identifier of the instruction $I_{(1, i+1)}$, wherein the identifier of the instruction $I_{(1, i+1)}$ is included in the data $D_{(1, i)}$;
  wherein the first $(i+1)^{th}$ processing circuit in the first circuit set is further configured to send the instruction $I_{(1, i+1)}$ to the second $(i+1)^{th}$ processing circuit in the second circuit set;
  wherein the first $(i+1)^{th}$ processing circuit in the first circuit set is further configured to:
    obtain data $D'_{(1, i+1)}$ according to the instruction $I_{(1, i+1)}$ and the first packet header; and
    send data $D_{(1, i+1)}$ and the first packet header to a first $(i+2)^{th}$ processing circuit in the first circuit set, wherein the data $D_{(1, i+1)}$ is obtained based on the data $D_{(1, i)}$ and the data $D'_{(1, i+1)}$; and
  wherein the second $(i+1)^{th}$ processing circuit in the second circuit set is configured to:
    obtain data $D'_{(2, i+1)}$ according to the instruction $I_{(1, i+1)}$ and the second packet header; and
    send data $D_{(2, i+1)}$ and the second packet header to a second $(i+2)^{th}$ processing circuit in the second circuit set, wherein the data $D_{(2, i+1)}$ is obtained based on the data $D_{(1, i)}$ and the data $D'_{(2, i+1)}$.

15. The network apparatus according to claim 14, wherein:
  the first $(i+2)^{th}$ processing circuit in the first circuit set is configured to:
    obtain an instruction $I_{(1, i+2)}$ based on an identifier of the instruction $I_{(1, i+2)}$, wherein the identifier of the instruction $I_{(1, i+2)}$ is included in the data $D_{(1, i+1)}$,
    obtain data $D'_{(1, i+2)}$ according to the instruction $I_{(1, i+2)}$ and the first packet header; and
    send the first packet header and data $D_{(1, i+2)}$ to a first $(i+3)^{th}$ processing circuit in the first circuit set, wherein the data $D_{(1, i+2)}$ is obtained based on the data $D_{(1, i+1)}$ and the data $D'_{(1, i+2)}$; and wherein the second $(i+2)^{th}$ processing circuit in the second circuit set is configured to:
    obtain an instruction $I_{(2, i+2)}$ based on an identifier of the instruction $I_{(2, i+2)}$, wherein the identifier of the instruction $I_{(2, i+2)}$ is included in the data $D_{(2, i+1)}$;
    obtain data $D'_{(2, i+2)}$ according to the instruction $I_{(2, i+2)}$ and the second packet header; and
    send data $D_{(2, i+2)}$ and the second packet header to a second $(i+3)^{th}$ processing circuit in the second circuit set, wherein the data $D_{(2, i+2)}$ is obtained based on the data $D_{(2, i+1)}$ and the data $D'_{(2, i+2)}$.

16. The network apparatus according to claim 13, wherein the first $(i+1)^{th}$ processing circuit in the first circuit set is configured to:
  obtain an instruction $I_{(1, i+1)}$ based on an identifier of the instruction $I_{(1, i+1)}$, wherein the identifier of the instruction $I_{(1, i+1)}$ is included in the data $D_{(1, i)}$;
  obtain data $D'_{(1, i+1)}$ according to the instruction $I_{(1, i+1)}$ and the first packet header; and
  send data $D_{(1, i+1)}$ and the first packet header to the first $(i+2)^{th}$ processing circuit in the first circuit set, wherein the data $D_{(1, i+1)}$ is obtained based on the data $D_{(1, i)}$ and the data $D'_{(1, i+1)}$; and
wherein the second $(i+1)^{th}$ processing circuit in the second circuit set is configured to:
  obtain an instruction $I_{(2, i+1)}$ based on an identifier of the instruction $I_{(2, i+1)}$, wherein the identifier of the instruction $I_{(2, i+1)}$ is included in the data $D_{(1, i)}$;
  obtain data $D'_{(2, i+1)}$ according to the instruction $I_{(2, i+1)}$ and the second packet header; and
  send data $D_{(2, i+1)}$ and the second packet header to the second $(i+2)^{th}$ processing circuit in the second circuit set, wherein the data $D_{(2, i+1)}$ is obtained based on the data $D_{(1, i)}$ and the data $D'_{(2, i+1)}$.

17. The network apparatus according to claim 16, wherein the first $(i+1)^{th}$ processing circuit in the first circuit set comprises an $(i+1)^{th}$ table lookup unit and an $(i+1)^{th}$ instruction executing unit, and wherein the second $(i+1)^{th}$ processing circuit in the second circuit set comprises an $(i+1)^{th}$ table lookup unit and an $(i+1)^{th}$ instruction executing unit;
  wherein the $(i+1)^{th}$ table lookup unit in the first $(i+1)^{th}$ processing circuit in the first circuit set is configured to obtain $B_{(1, i+1)}$ by table lookup;
  wherein the $(i+1)^{th}$ instruction executing unit in the first $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header;
  wherein the $(i+1)^{th}$ table lookup unit in the second $(i+1)^{th}$ processing circuit in the second circuit set is configured to obtain data $B_{(2, i+1)}$ by table lookup; and
  wherein the $(i+1)^{th}$ instruction executing unit in the second $(i+1)^{th}$ processing circuit in the second circuit set is configured to obtain the data $D'_{(2, i+1)}$ according to the instruction $I_{(2, i+1)}$, the data $B_{(2, i+1)}$, and the second packet header.

18. The network apparatus according to claim 17, further comprising an aggregator and a table lookup engine;
  wherein the $(i+1)^{th}$ table lookup unit in the first $(i+1)^{th}$ processing circuit in the first circuit set is configured to:
    send a table lookup request $Q_{(1, i+1)}$ to the aggregator; and
    receive the data $B_{(1, i+1)}$ fed back by the aggregator;
  wherein the $(i+1)^{th}$ table lookup unit in the second $(i+1)^{th}$ processing circuit in the second circuit set is configured to:

send a table lookup request $Q_{(2, i+1)}$ to the aggregator; and receive the data $B_{(2, i+1)}$ fed back by the aggregator; and wherein the aggregator is configured to:

send the table lookup request $Q_{(2, i+1)}$ or the table lookup request $Q_{(1, i+1)}$ to the table lookup engine, after receiving the table lookup request $Q_{(2, i+1)}$ and the table lookup request $Q_{(1, i+1)}$;

receive the data $B_{(2, i+1)}$ sent by the table lookup engine in response to the table lookup request $Q_{(2, i+1)}$ or the table lookup request $Q_{(1, i+1)}$;

feed back the data $B_{(1, i+1)}$ to the $(i+1)^{th}$ table lookup unit in the first $(i+1)^{th}$ processing circuit in the first circuit set; and feed back the data $B_{(2, i+1)}$ to the $(i+1)^{th}$ table lookup unit in the second $(i+1)^{th}$ processing circuit in the second circuit set, wherein the data $B_{(2, i+1)}$ is the same as the data $B_{(1, i+1)}$, and wherein the table lookup request $Q_{(2, i+1)}$ and the table lookup request $Q_{(1, i+1)}$ comprise a same table search key value.

19. The network apparatus according to claim 13, further comprising an arbiter;

wherein the arbiter is configured to send a data sharing indication to the first $i^{th}$ processing circuit in the first circuit set in response to determining that a type or a value of a third field in the second packet header to be processed by the second $(i+1)^{th}$ processing circuit in the second circuit set is different from a type or a value of a fourth field in the first packet header to be processed by the first $(i+1)^{th}$ processing circuit in the first circuit set; and wherein the first $i^{th}$ processing circuit in the first circuit set is configured to send the data $D_{(1, i)}$ to the second $(i+1)^{th}$ processing circuit in the second circuit set in response to the data sharing indication.

20. A network apparatus, comprising a first circuit set and a second circuit set;

wherein the first circuit set comprises a first $i^{th}$ processing circuit and a first $(i+1)^{th}$ processing circuit;

wherein the second circuit set comprises a second $i^{th}$ processing circuit and a second $(i+1)^{th}$ processing circuit;

wherein the first circuit set is configured to:

receive a first packet header and data $D_{(1, i-1)}$;

obtain an instruction $I_{(1, i)}$ based on an identifier of the instruction $I_{(1, i)}$, wherein the identifier of the instruction $I_{(1, i)}$ is included in the data $D_{(1, i-1)}$;

send the instruction $I_{(1, i)}$ to the second $i^{th}$ processing circuit in the second circuit set;

obtain data $D'_{(1, i)}$ according to the instruction $I_{(1, i)}$ and the first packet header; and send data $D_{(1, i)}$ and the first packet header to the first $(i+1)^{th}$ processing circuit in the first circuit set, wherein the data $D_{(1, i)}$ is obtained based on the data $D_{(1, i-1)}$ and the data $D'_{(1, i)}$; and wherein the second $i^{th}$ processing circuit of the second circuit set is configured to:

receive a second packet header and data $D_{(2, i-1)}$;

obtain data $D'_{(2, i)}$ according to the instruction $I_{(1, i)}$ and the second packet header; and send data $D_{(2, i)}$ and the second packet header to the second $(i+1)^{th}$ processing circuit in the second circuit set, wherein the data $D_{(2, i)}$ is obtained based on the data $D'_{(2, i)}$ and the data $D_{(2, i-1)}$.

21. The network apparatus according to claim 20, wherein the first $(i+1)^{th}$ processing circuit in the first circuit set is configured to:

obtain an instruction $I_{(1, i+1)}$ based on an identifier of the instruction wherein the identifier of the instruction $I_{(1, i+1)}$ is included in the data $D_{(1, i)}$;

obtain data $D'_{(1, i+1)}$ according to the instruction $I_{(1, i+1)}$ and the first packet header; and send data $D_{(1, i+1)}$ and the first packet header to a first $(i+2)^{th}$ processing circuit in the first circuit set, wherein the data $D_{(1, i+1)}$ is obtained based on the data $D_{(1, i)}$ and the data $D'_{(1, i+1)}$; and wherein the second $(i+1)^{th}$ processing circuit in the second circuit set is configured to:

obtain an instruction $I_{(2, i+1)}$ based on an identifier of the instruction $I_{(2, i+1)}$, wherein the identifier of the instruction $I_{(2, i+1)}$ is included in the data $D_{(2, i)}$;

obtain data $D'_{(2, i+1)}$ according to the instruction $I_{(2, i+1)}$ and the second packet header; and send data $D_{(2, i+1)}$ and the second packet header to the second $(i+2)^{th}$ processing circuit in the second circuit set, wherein the data $D_{(2, i+1)}$ is obtained based on the data $D_{(2, i)}$ and the data $D'_{(2, i+1)}$.

22. The network apparatus according to claim 21, wherein:

the first $(i+1)^{th}$ processing circuit in the first circuit set comprises an $(i+1)^{th}$ table lookup unit and an $(i+1)^{th}$ instruction executing unit;

wherein the second $(i+1)^{th}$ processing circuit in the second circuit set comprises an $(i+1)^{th}$ table lookup unit and an $(i+1)^{th}$ instruction executing unit;

wherein the $(i+1)^{th}$ table lookup unit in the first $(i+1)^{th}$ processing circuit in the first circuit set is configured to obtain data $B_{(1, i+i)}$ by table lookup;

wherein the $(i+1)^{th}$ instruction executing unit in the first $(i+1)^{th}$ processing circuit in the first circuit set is configured to obtain the data $D'_{(1, i+1)}$ according to the instruction $I_{(1, i+1)}$, the data $B_{(1, i+1)}$, and the first packet header;

wherein the $(i+1)^{th}$ table lookup unit in the second $(i+1)^{th}$ processing circuit in the second circuit set is configured to obtain data $B_{(2, i+1)}$ by table lookup; and wherein the $(i+1)^{th}$ instruction executing unit in the second $(i+1)^{th}$ processing circuit in the second circuit set is configured to obtain the data $D'_{(2, i+1)}$ according to the instruction $I_{(2, i+1)}$, the data $B_{(2, i+1)}$, and the second packet header.

23. The network apparatus according to claim 22, wherein the network apparatus further comprises an aggregator and a table lookup engine;

wherein the $(i+1)^{th}$ table lookup unit in the first $(i+1)^{th}$ processing circuit in the first circuit set is configured to:

send a table lookup request $Q_{(1, i+1)}$ to the aggregator; and receive the data $B_{(1, i+1)}$ fed back by the aggregator;

wherein the $(i+1)^{th}$ table lookup unit in the second $(i+1)^{th}$ processing circuit in the second circuit set is configured to:

send a table lookup request $Q_{(2, i+1)}$ to the aggregator; and receive the data $B_{(2, i+1)}$ fed back by the aggregator; and wherein the aggregator is configured to:

send the table lookup request $Q_{(2, i+1)}$ or the table lookup request $Q_{(1, i+1)}$ to the table lookup engine, after receiving the table lookup request $Q_{(2, i+1)}$ and the table lookup request $Q_{(1, i+1)}$; and receive the data $B_{(2, i+1)}$ sent by the table lookup engine in response to the table lookup request $Q_{(2, i+1)}$ or the table lookup request $Q_{(1, i+1)}$, wherein the table lookup request $Q_{(2, i+1)}$ and the table lookup request $Q_{(1, i+1)}$ comprise a same table search key value, and the data $B_{(1, i+1)}$ is the same as the data $B_{(2, i+1)}$.

24. The network apparatus according to claim 20, further comprising an arbiter, wherein the arbiter is configured to send an instruction sharing indication to the first $i^{th}$ processing circuit in the first circuit set in response to it being determined that the identifier of the instruction $I_{(1, i)}$, wherein the identifier of the instruction $I_{(1, i)}$ is included in the data $D_{(1, i-1)}$ is the same as an identifier of an instruction $I_{(2, i)}$, wherein the identifier of the instruction $I_{(2, i)}$ is included in the data $D_{(2, i-1)}$; and wherein the first $i^{th}$ processing circuit in the first circuit set is configured to send the instruction $I_{(1, i)}$ to the second $i^{th}$ processing circuit in the second circuit set in response to the instruction sharing indication.

* * * * *

UNITED STATES PATENT AND TRADEMARK OFFICE
CERTIFICATE OF CORRECTION

PATENT NO. : 10,277,509 B2
APPLICATION NO. : 15/392144
DATED : April 30, 2019
INVENTOR(S) : Li et al.

Page 1 of 1

It is certified that error appears in the above-identified patent and that said Letters Patent is hereby corrected as shown below:

In the Claims

In Column 36, Line 52, Claim 2, delete "instruction $ID_{(1, i+1)}$" and insert --instruction $I_{(1, i+1)}$--.

Signed and Sealed this
Twenty-seventh Day of August, 2019

Andrei Iancu
*Director of the United States Patent and Trademark Office*